(12) United States Patent
Tsuji et al.

(10) Patent No.: US 10,705,702 B2
(45) Date of Patent: Jul. 7, 2020

(54) INFORMATION PROCESSING DEVICE, INFORMATION PROCESSING METHOD, AND COMPUTER PROGRAM

(71) Applicants: SONY CORPORATION, Tokyo (JP); SONY ELECTRONICS INC., Parkridge, NJ (US)

(72) Inventors: Tomohiro Tsuji, Nagano (JP); Kazuma Igari, Kanagawa (JP); Katsuhiro Suzuki, Nagano (JP); Fumitaka Ozaki, Tokyo (JP); Tsuyoshi Yamamoto, Kanagawa (JP); Allison Marlene Chaney, San Francisco, CA (US); Julia Anne Framel, San Francisco, CA (US)

(73) Assignees: SONY CORPORATION, Tokyo (JP); SONY ELECTRONICS INC., Parkridge, NJ (US)

( * ) Notice: Subject to any disclaimer, the term of this patent is extended or adjusted under 35 U.S.C. 154(b) by 268 days.

(21) Appl. No.: 14/902,435

(22) PCT Filed: Jun. 27, 2014

(86) PCT No.: PCT/JP2014/067242
§ 371 (c)(1),
(2) Date: Dec. 31, 2015

(87) PCT Pub. No.: WO2015/005148
PCT Pub. Date: Jan. 15, 2015

(65) Prior Publication Data
US 2016/0378318 A1 Dec. 29, 2016

Related U.S. Application Data

(60) Provisional application No. 61/845,654, filed on Jul. 12, 2013.

(51) Int. Cl.
*G06F 3/0481* (2013.01)
*G06F 3/0486* (2013.01)
(Continued)

(52) U.S. Cl.
CPC ........ *G06F 3/04847* (2013.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS

2010/0083111 A1\* 4/2010 de los Reyes ........ G06F 3/0482
715/702
2011/0029864 A1\* 2/2011 Stewart ............... G06F 3/04883
715/702
(Continued)

FOREIGN PATENT DOCUMENTS

EP 2600234 A1 6/2013
JP 2010-040029 2/2010
(Continued)

OTHER PUBLICATIONS

Aero Shake and Tab Changing—windows7support247 (Year: 2011).\*
(Continued)

*Primary Examiner* — Beau D Spratt
(74) *Attorney, Agent, or Firm* — Paratus Law Group, PLLC

(57) ABSTRACT

Provided is an information processing device for enabling a plurality of content to be efficiently used on the same screen, the information processing device including: a manipulation detection unit configured to detect a manipulation by a user; and a control unit configured to control display on a screen according to the detection of the manipulation detection
(Continued)

unit. The control unit performs control to cause, when the manipulation detection unit detects a manipulation for bringing at least two pieces of content displayed on the screen into contact with each other under control by the control unit, the at least two pieces of content to be displayed in alignment.

11 Claims, 24 Drawing Sheets

(51) Int. Cl.
  *G06F 3/0484* (2013.01)
  *G06F 3/0488* (2013.01)
  *G06F 3/0482* (2013.01)

(52) U.S. Cl.
  CPC ........ *G06F 3/0488* (2013.01); *G06F 3/04817* (2013.01); *G06F 3/04845* (2013.01); *G06F 3/04883* (2013.01); *G06F 2203/04803* (2013.01); *G06F 2203/04808* (2013.01)

(56) References Cited

U.S. PATENT DOCUMENTS

| | | | | |
|---|---|---|---|---|
| 2011/0055773 A1* | 3/2011 | Agarawala | ............... | G06F 3/016 715/863 |
| 2011/0209102 A1* | 8/2011 | Hinckley | ............... | G06F 3/0483 715/863 |
| 2011/0252350 A1* | 10/2011 | Chaudhri | ............ | G06F 3/04817 715/769 |
| 2011/0265043 A1 | 10/2011 | Knitowski et al. | | |
| 2012/0026100 A1* | 2/2012 | Migos | .................. | G06F 3/04883 345/173 |
| 2012/0147057 A1* | 6/2012 | Lee | ........................ | G06F 3/0482 345/681 |
| 2013/0019193 A1* | 1/2013 | Rhee | ..................... | G06F 3/0486 715/769 |
| 2013/0167090 A1* | 6/2013 | Tomizu | .................. | G06F 3/0482 715/835 |
| 2013/0187866 A1* | 7/2013 | Kim | ...................... | G06F 3/0488 345/173 |
| 2014/0149901 A1* | 5/2014 | Hunter | .................. | H04L 12/282 715/765 |
| 2014/0218372 A1* | 8/2014 | Missig | .................... | G06F 3/044 345/473 |

FOREIGN PATENT DOCUMENTS

| | | |
|---|---|---|
| JP | 2010-067126 | 3/2010 |
| JP | 2011-034152 | 2/2011 |
| JP | 2013-105395 | 5/2013 |
| WO | WO2013/031373 A1 | 3/2013 |

OTHER PUBLICATIONS

Feb. 14, 2017, EP communication issued for related EP application No. 14823407.3.

Meredith Ringel Morris, et al., Cooperative Gestures: Multi-User Gestural Interactions for Co-located Groupware, Proceedings of the SIGCHI conference on Human Factors in computing systems, ACM, Apr. 22-28, 2006, pp. 1201-1210.

* cited by examiner

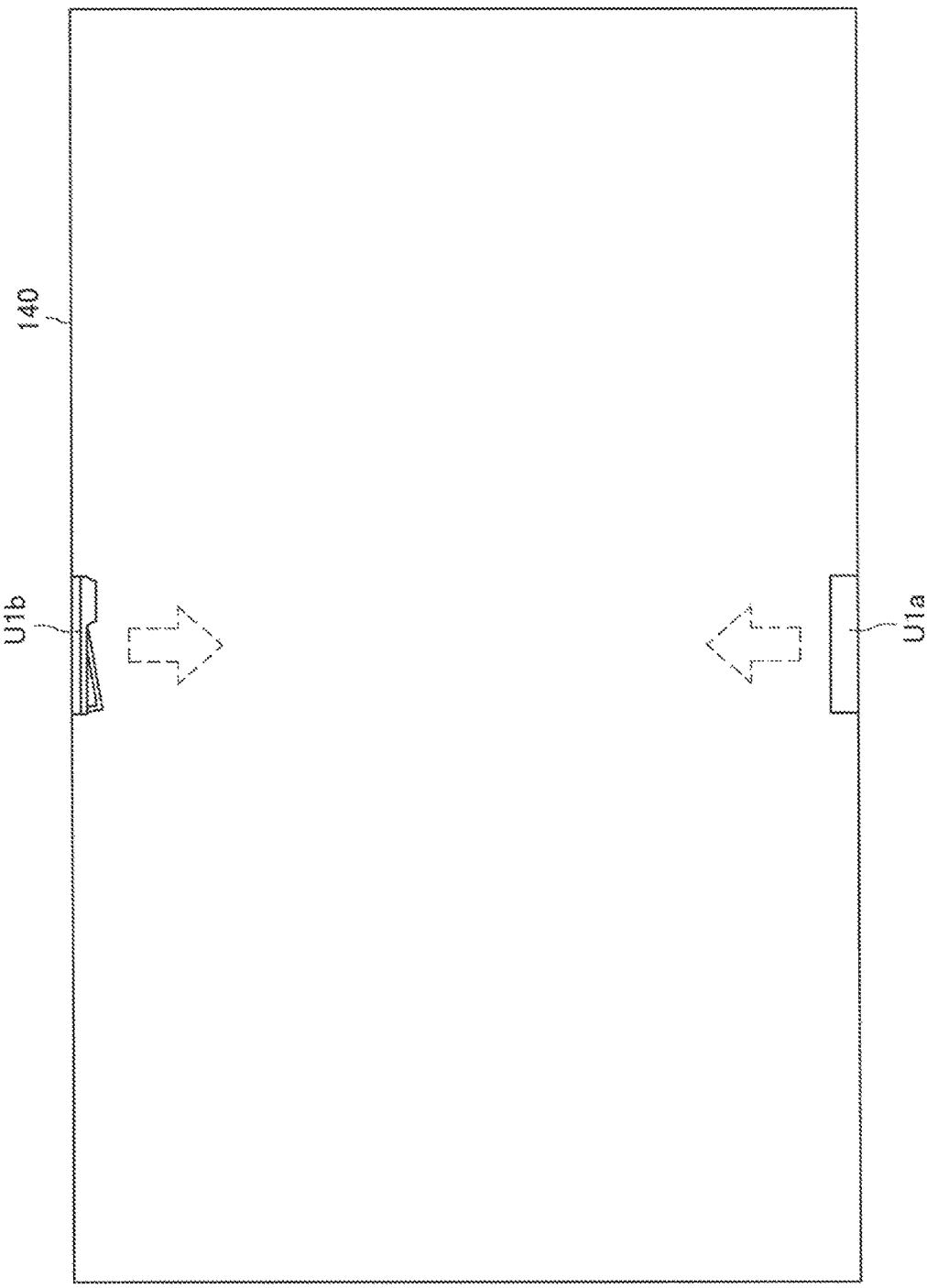

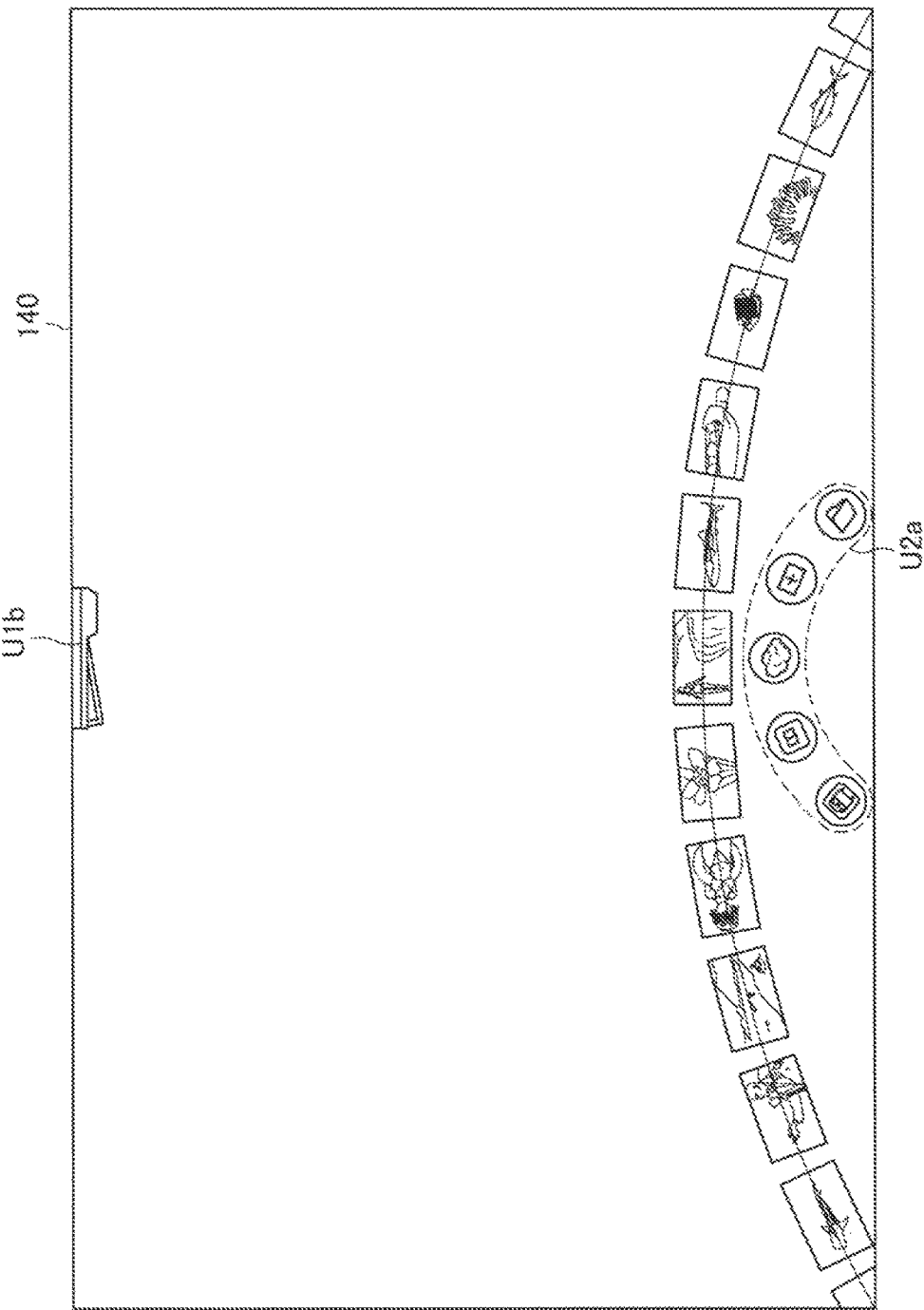

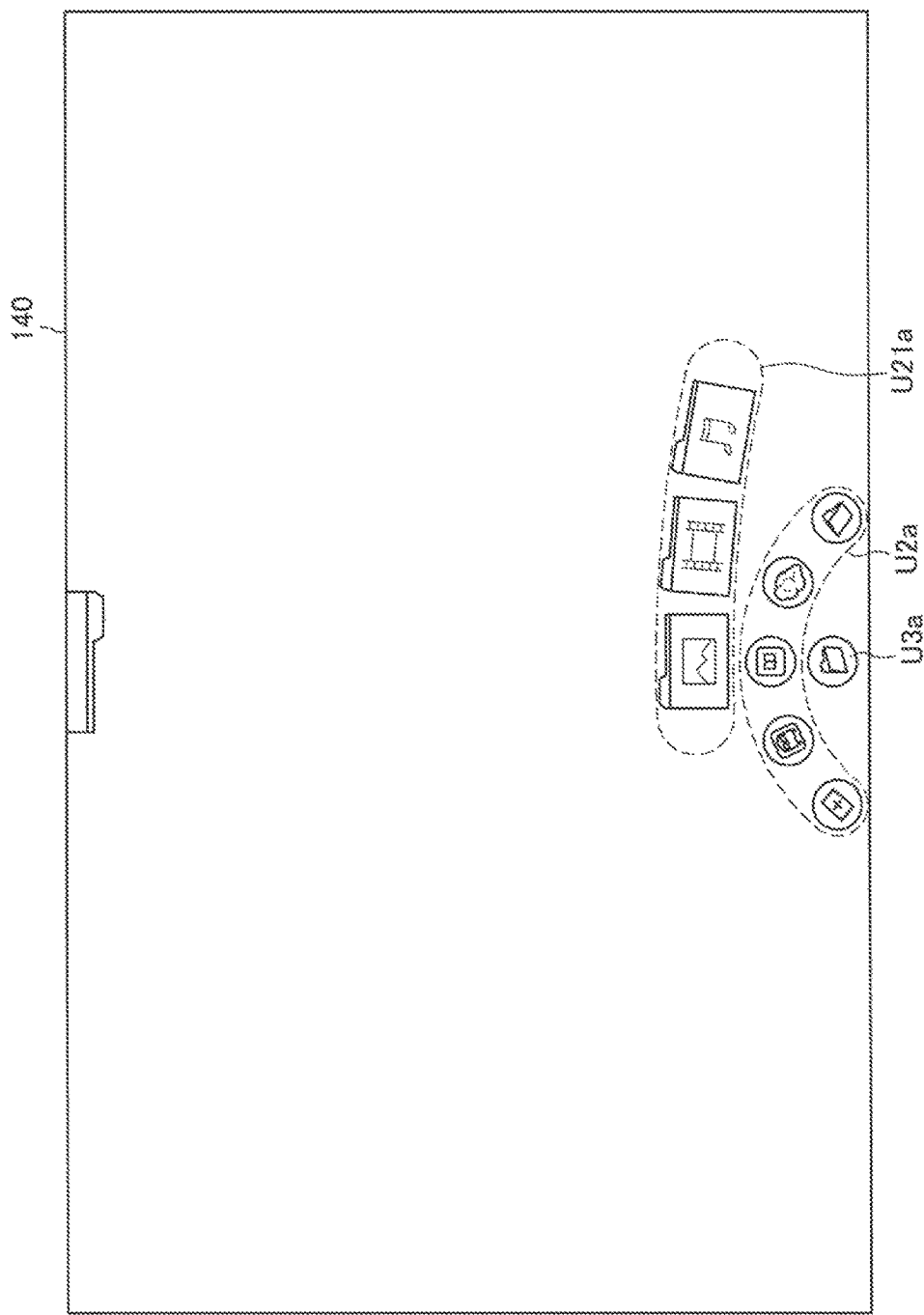

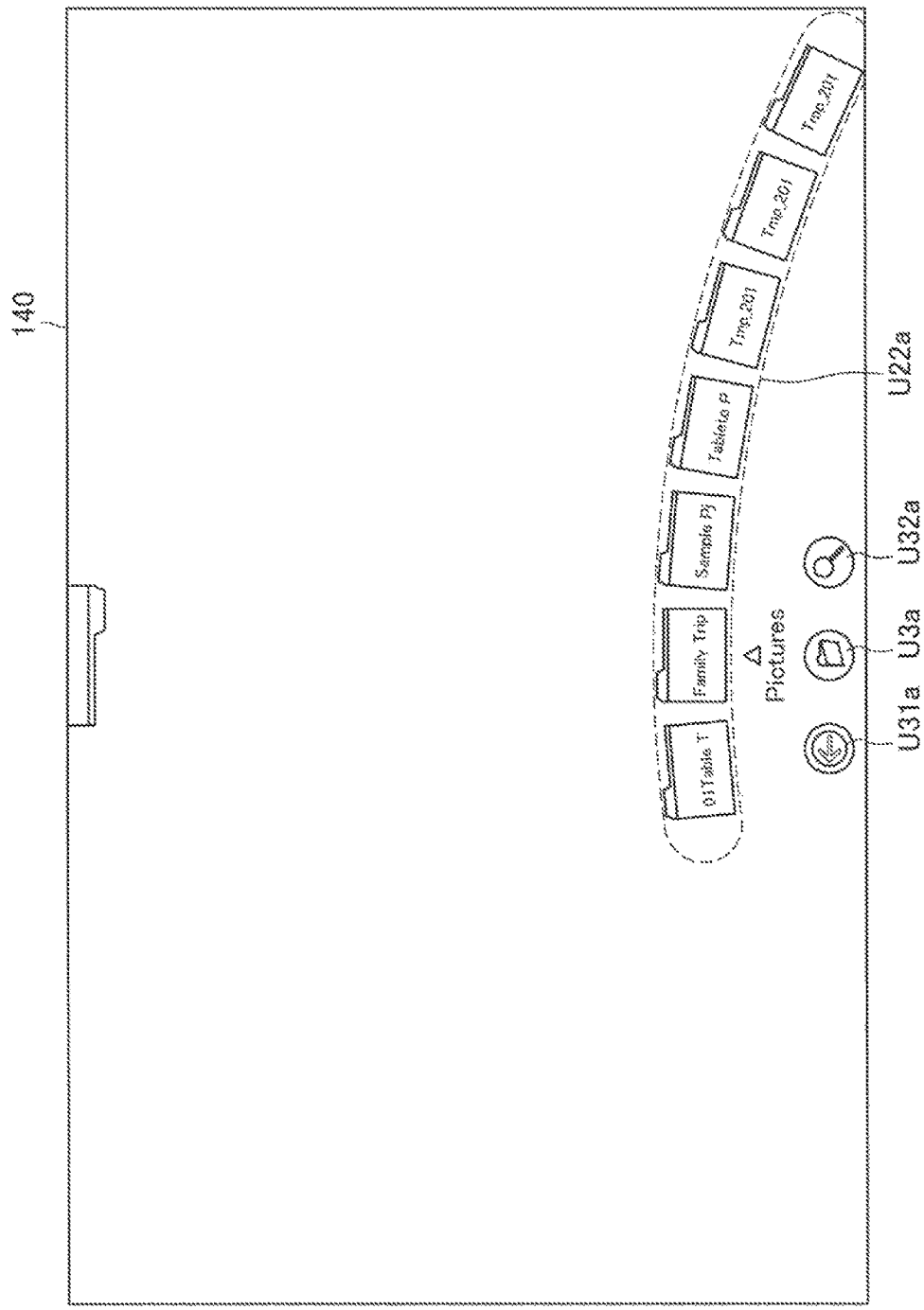

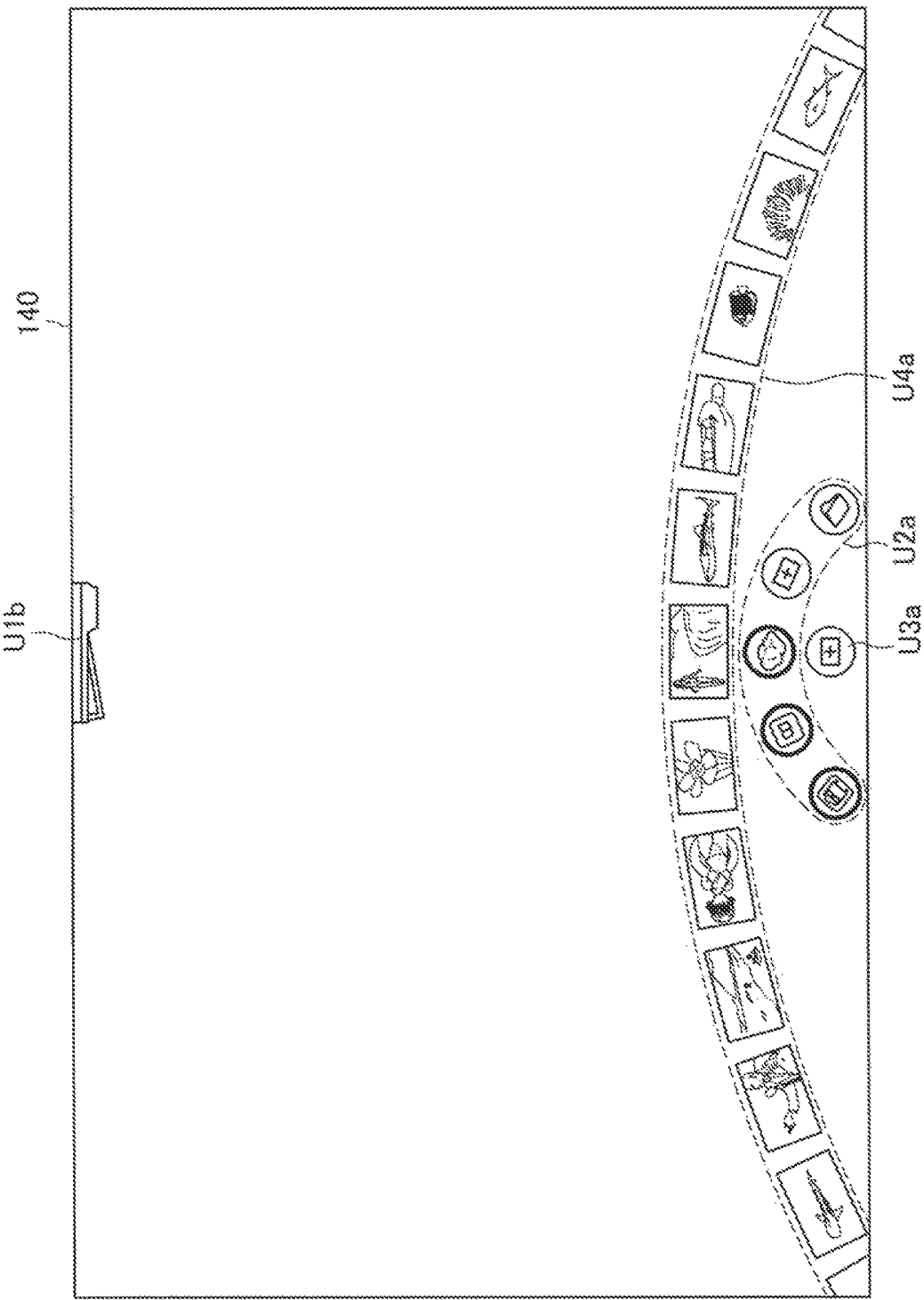

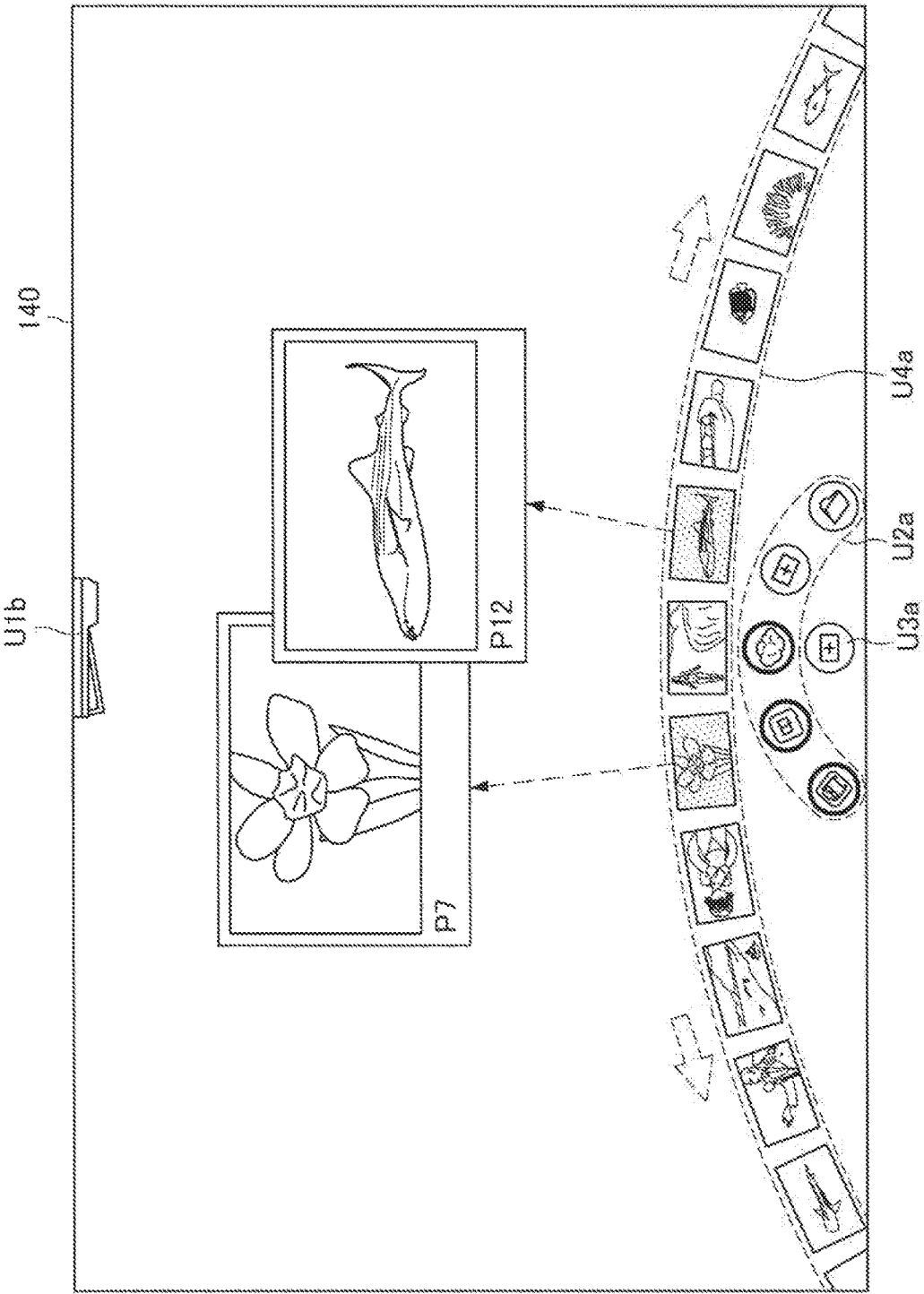

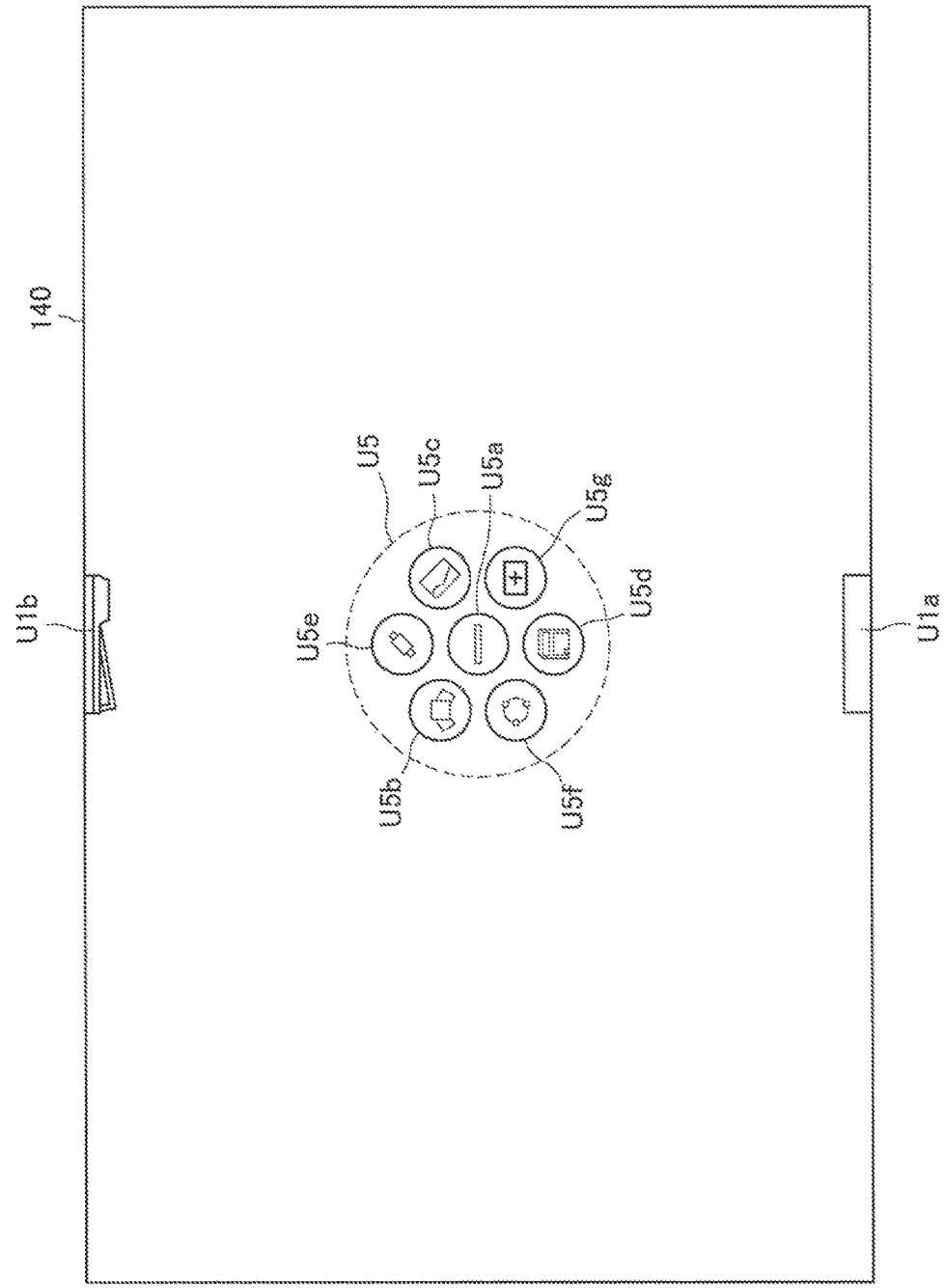

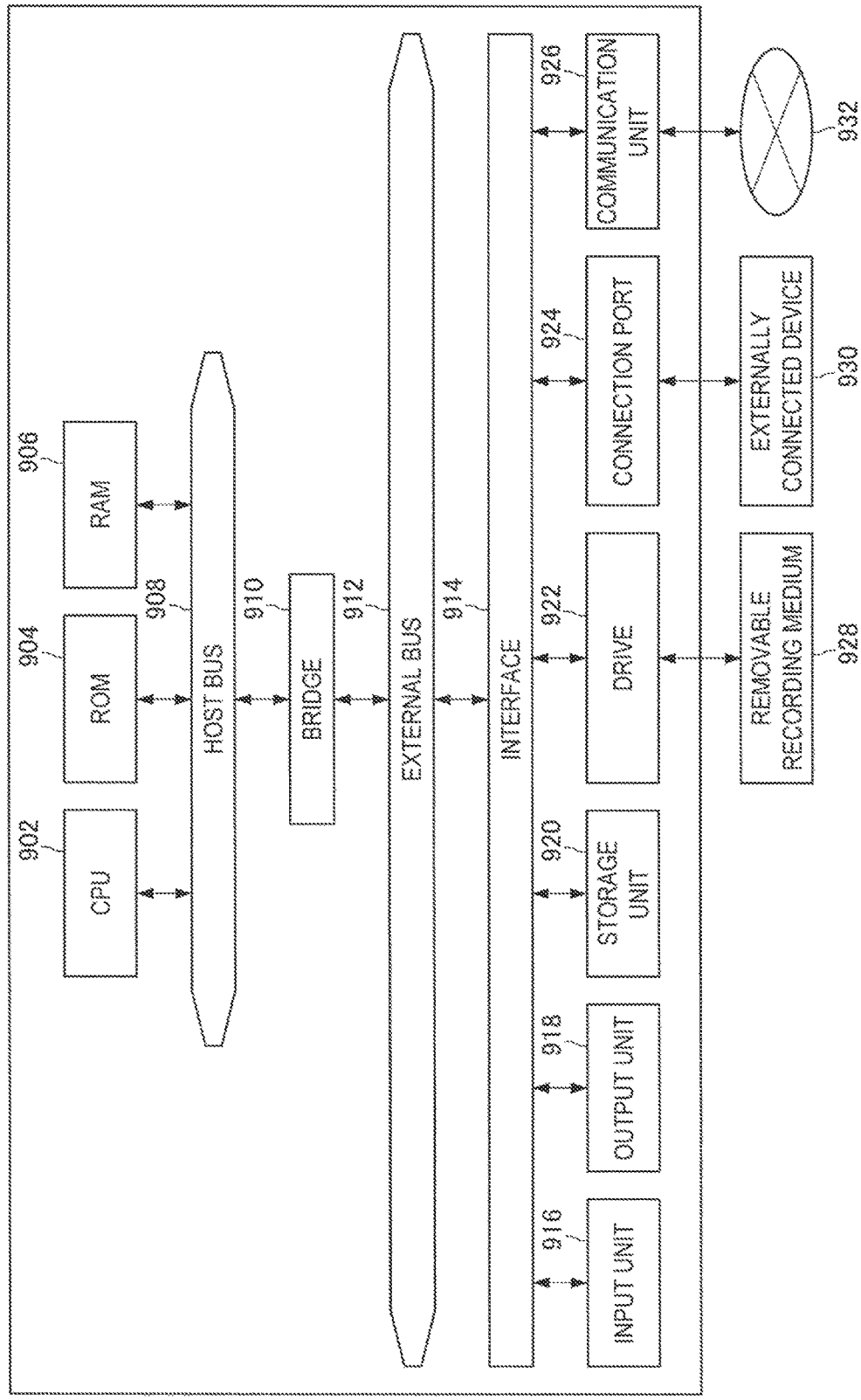

INFORMATION PROCESSING DEVICE, INFORMATION PROCESSING METHOD, AND COMPUTER PROGRAM

CROSS REFERENCE TO PRIOR APPLICATION

This application is a National Stage Patent Application of PCT International Patent Application No. PCT/JP2014/067242 (filed on Jun. 27, 2014) under 35 U.S.C. § 371, which claims priority to U.S. Provisional Patent Application No. 61/845,654 (filed on Jul. 12, 2013), which are all hereby incorporated by reference in their entirety.

TECHNICAL FIELD

The present disclosure relates to an information processing device, an information processing method, and a computer program.

BACKGROUND ART

The spread of high-function mobile phones (also referred to as smartphones) and tablet type portable terminals (also referred to simply as tablet terminals) equipped with a touch panel on a screen has progressed. Because this device is assumed to allow a user to directly manipulate a screen with a finger, a stylus pen, or the like, it is possible to provide the user with intuitive manipulation (for example, see Patent Literature 1, etc.

CITATION LIST

Patent Literature

Patent Literature 1: JP 2013-105395A

SUMMARY OF INVENTION

Technical Problem

Recently, a screen size of a device equipped with a touch panel in such a screen has increased and the number of cases in which not only a single user but a plurality of users simultaneously manipulate the same screen has increased. In view of the above-described circumstances, it is necessary to enable a plurality of content (which refers to image data, video data, music data, document data, data obtained by clipping a Web page, and other data) to be efficiently used on the same screen.

Therefore, the present disclosure provides a novel and improved information processing device, information processing method, and computer program for enabling a plurality of content to be efficiently used on the same screen.

Solution to Problem

According to the present disclosure, there is provided an information processing device including: a manipulation detection unit configured to detect a manipulation by a user; and a control unit configured to control display on a screen according to the detection of the manipulation detection unit. The control unit performs control to cause, when the manipulation detection unit detects a manipulation for bringing at least two pieces of content displayed on the screen into contact with each other under control by the control unit, the at least two pieces of content to be displayed in alignment.

According to the present disclosure, there is provided an information processing method including: a step of detecting a manipulation by a user; and a step of controlling display on a screen according to the detection of the manipulation by the user in the detection step. When a manipulation for bringing at least two pieces of content displayed on the screen into contact with each other is detected in the detection step, the at least two pieces of content are controlled to be displayed in alignment in the display control step.

According to de present disclosure, there is provided a computer program for causing a computer to execute: a step of detecting a manipulation by a user; and a step of controlling display on a screen according to the detection of the manipulation by the user in the detection step. When a manipulation for bringing at least two pieces of content displayed on the screen into contact with each other is detected in the detection step, the at least two pieces of content are controlled to be displayed in alignment in the display control step.

Advantageous Effects of Invention

As described above, according to the present disclosure, a novel and improved information processing device, information processing method, and computer program for enabling a plurality of content to be efficiently used on the same screen can be provided.

BRIEF DESCRIPTION OF DRAWINGS

FIG. 3 is an explanatory diagram illustrating an example of a user interface.

FIG. 4A is an explanatory diagram illustrating an example of a user interface.

FIG. 4B is an explanatory diagram illustrating an example of a user interface.

FIG. 4C is an explanatory diagram illustrating an example of a user interface.

FIG. 5 is an explanatory diagram illustrating an example of a user interface.

FIG. 6 is an explanatory diagram illustrating an example of a user interface.

FIG. 7 is an explanatory diagram illustrating an example of a user interface.

FIG. 23 is an explanatory diagram illustrating a hardware configuration example.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

In addition, description will be provided in the following order.

<1. Embodiment of present disclosure>
[Functional configuration example of information processing device]
[Operation example of information processing device]
[Example of user interface displayed by information processing device]
<2. Hardware configuration example>
<3. Conclusion>

1. EMBODIMENT OF PRESENT DISCLOSURE

[Functional Configuration Example of Information Processing Device]

Figure 1:
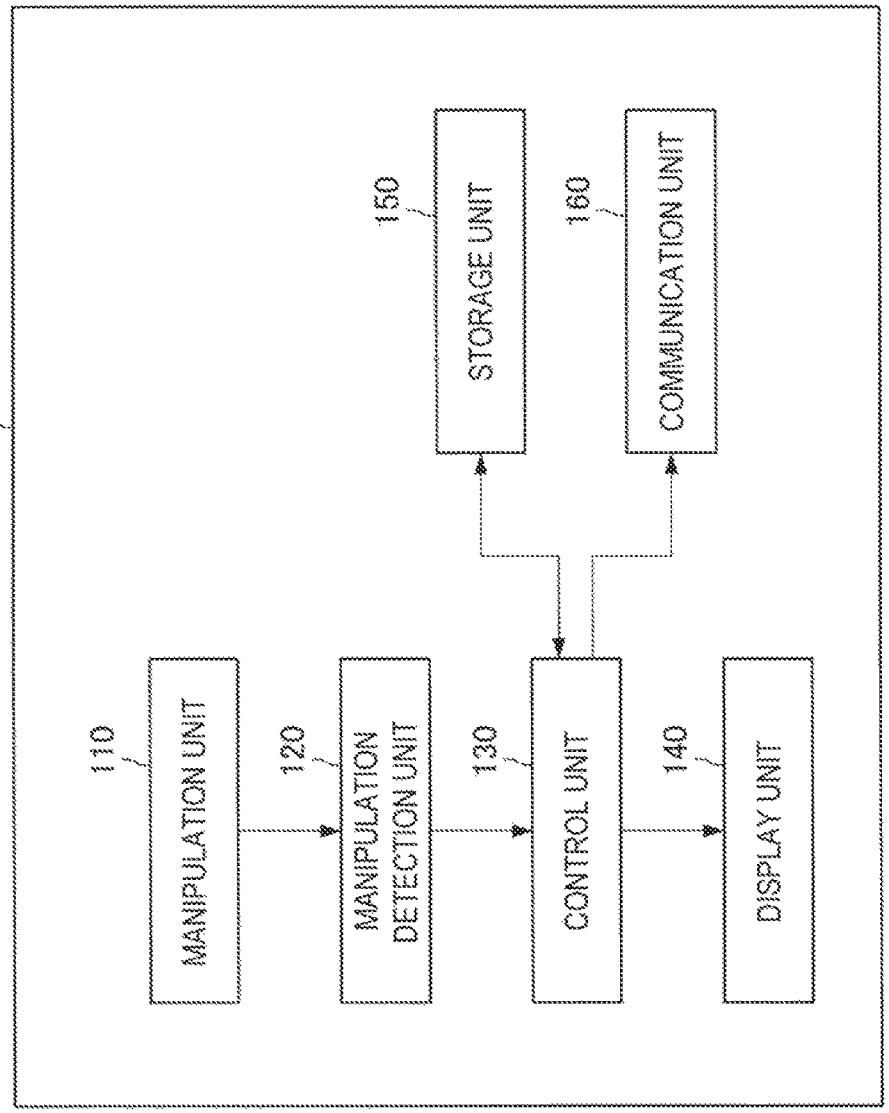
FIG. 1 is an explanatory diagram illustrating a functional configuration example of an information processing device 100 according to an embodiment of the present disclosure.

First, a functional configuration example of a display device according to an embodiment of the present disclosure will be described with reference to the drawings. FIG. 1 is an explanatory diagram illustrating a functional configuration example of an information processing device 100 according to an embodiment of the present disclosure. Hereinafter, the functional configuration example of the information processing device 100 according to the embodiment of the present disclosure will be described using FIG. 1.

The information processing device 100 according to the embodiment of the present disclosure illustrated in FIG. 1 is configured to receive a manipulation by allowing a user to touch a screen with a finger or the like, for example, as in a smartphone, a tablet terminal, a game machine, etc. As illustrated in FIG. 1, the information processing device 100 according to the embodiment of the present disclosure is configured to include a manipulation unit 110, a manipulation detection unit 120, a control unit 130, a display unit 140, a storage unit 150, and a communication unit 160.

The manipulation unit 110 receives a manipulation from the user on the information processing device 100. In this embodiment, a touch panel provided to be integrated with the manipulation unit 110 on the surface of the display unit 140 or on the display unit 140 may be used. In addition to the touch panel provided to be integrated with the manipulation unit 110 on the surface of the display unit 140 or on the display unit 140, hard keys or buttons may be used. The user's manipulation performed on the manipulation unit 110 is detected by the manipulation detection unit 120.

For example, an electrostatic capacitive type touch panel or a resistive film type touch panel can be adopted as the touch panel. The electrostatic capacitive type touch panel is formed by providing a conductive film on a display screen of the display unit 140. When a touch manipulation by the user's finger is performed, the electrostatic capacitive type touch panel detects coordinates of a position of the touch manipulation based on a change in electrostatic capacitance occurring between a tip of the finger and the conductive film.

The resistive film type touch panel is formed by superimposing a soft surface film such as polyethylene terephthalate (PET) with a liquid crystal glass film placed on the back of the soft surface film in parallel on a display screen of the display unit 140. Both the films are pasted transparent conductive films and are electrically insulated via a transparent spacer. A conductor passes through each of the surface film and the glass film, and the surface film is bent through the stress by the finger and the surface film and the glass film are partially in a conductive state when a touch manipulation is performed with the finger. At this time, an electrical resistance value or potential changes according to a contact state of the finger. The manipulation detection unit 120 detects the contact of the finger, the number of contacts of the finger, and a type of touch manipulation based on coordinates at which the above-described electrical resistance value or potential changes.

In the following description, unless otherwise specified, the manipulation unit 110 will be described assuming that the touch panel provided to be integrated with the manipulation unit 110 on the surface of the display unit 140 or on the display unit 140 is included.

The manipulation detection unit 120 detects content of the user's manipulation performed on the manipulation unit 110. For example, when the user touches the manipulation unit 110 with a finger or brings the finger in proximity to the manipulation unit 110 at less than a fixed distance, the manipulation detection unit 120 can detect coordinates of a position touched by the user with the finger or a position to which the user brings the finger in proximity, a change amount of a touch or proximity position, a change speed, the number of touch or proximity points, etc. When content of the user's manipulation performed on the manipulation unit 110 is detected, the manipulation detection unit 120 sends a detection result to the control unit 130.

The control unit 130 controls execution of an application saved in the information processing device 100 and display of text, an image, and other information for the display unit 140. When the result of detecting the content of the user's manipulation performed on the manipulation unit 110 is received from the manipulation detection unit 120, the control unit 130 controls the display of the text, the image, and the other information for the display unit 140 based on the detection result. Accordingly, the control unit 130 can function as an example of a display control unit of the present disclosure.

Although a control example of the display on the display unit 140 by the control unit 130 will be described in detail below, a simple description will be provided here. The user of the information processing device 100 is assumed to execute the manipulation for causing the information processing device 100 to execute a predetermined application using the manipulation unit 110. According to activation of the application, the information processing device 100 displays a menu for manipulating the application on the display unit 140.

In this embodiment, there is an application in which one or more users use content (for example, data such as image data, video data, music data, document data, data obtained by clipping a Web page, etc.) as an example of a predetermined application. Hereinafter, this application is also referred to as a "content browsing application." In addition, using the content here indicates that the content is displayed, reproduced, changed, saved, or the like.

The display unit 140 displays text, an image, and other information. The display unit 140 is controlled to display the text, the image, and the other information by the control unit 130. In the display unit 140, for example, a liquid crystal display, an organic electroluminescence (EL) device, or the like can be used. As described above, a touch panel integrated with the surface of the display unit 140 or the display unit 140 can be provided.

The storage unit 150 stores various information. The information stored by the storage unit 150, for example, is a setting value for the information processing device 100, document data, image data, and music data for use in the information processing device 100, etc. The information stored in the storage unit 150 can be read by the control unit 130 and displayed on the display unit 140, if necessary. In addition, in the storage unit 150, information can be stored according to control of the control unit 130.

The communication unit 160 is an interface configured to perform communication with the other device. The control unit 130 can control the communication of the communication unit 160 with the other device. For example, the communication unit 160 can transmit the information stored in the storage unit 150 according to control of the control unit 130.

The functional configuration example of the information processing device 100 according to the embodiment of the present disclosure has been described above using FIG. 1. Next, an operation example of the information processing device 100 according to an embodiment of the present disclosure will be described.

[Operation Example of Information Processing Device]

Figure 2:
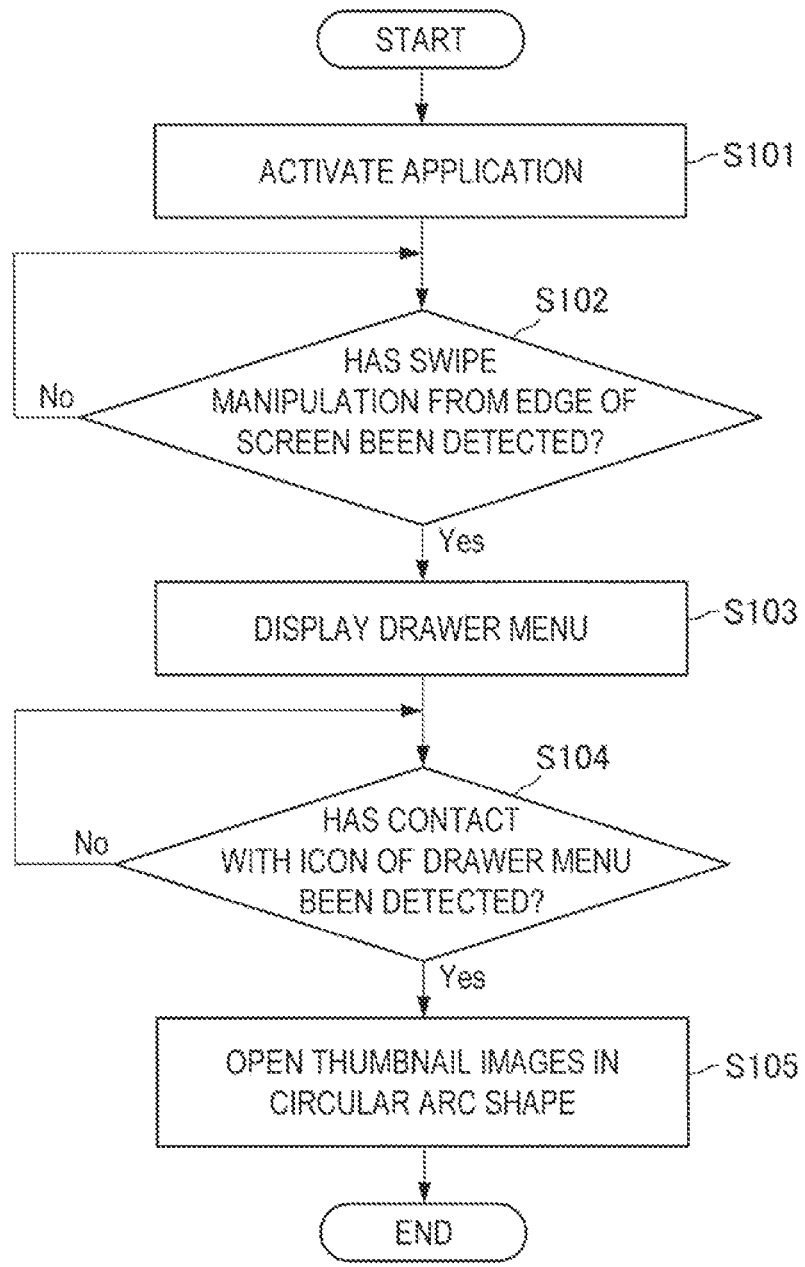
FIG. 2 is an explanatory diagram illustrating an operation example of the information processing device 100 according to an embodiment of the present disclosure.

FIG. 2 is a flowchart illustrating an operation example of the information processing device 100 according to an embodiment of the present disclosure. In FIG. 2, an example of an operation of the information processing device 100 for showing that information to be displayed on the display unit 140 changes according to activation of the content browsing application or the user's manipulation on the content browsing application is illustrated. Hereinafter, an operation example of the information processing device 100 according to an embodiment of the present disclosure will be described using FIG. 2.

When the user of the information processing device 100 executes a manipulation of activating the content browsing application, the information processing device 100 executes the activation of the content browsing application according to the manipulation in the control unit 130 (step S101). Also, the content browsing application may be pre-stored in the storage unit 150 or acquired from a server every time the activation manipulation by the user is performed after the communication unit 160 is connected to the server on the Internet.

When the content browsing application is activated by the information processing device 100 in the above-described step S101, the information processing device 100 subsequently waits until the manipulation detection unit 120 detects a swipe manipulation by the user from the edge of the screen (the edge of the display unit 140), that is, a manipulation in which the finger slides in a state in which the user is touching the screen (step S102). When the manipulation detection unit 120 detects the swipe manipulation by the user from the edge of the screen, the information processing device 100 subsequently executes a process of displaying a drawer menu on the display unit 140 based on the detection of the swipe manipulation (step S103).

This drawer menu is a menu for indicating a content save source by one or more icons, and is a menu in which icons are disposed in a circular arc shape around a center point of one side of the screen as will be described in detail below. The user can select the content save source by selecting an icon displayed in the drawer menu.

In addition, the content browsing application to be executed by the information processing device 100 can cause the drawer menu to be displayed according to the swipe manipulation on a plurality of sides as well as the swipe manipulation for one specific side of the screen. The content browsing application to be executed by the information processing device 100 enables a plurality of users to easily use content by displaying the drawer menu through the swipe manipulation on a plurality of sides.

When the content browsing application displays the drawer menu in the above-described step S103, the information processing device 100 subsequently waits until the manipulation detection unit 120 detects a manipulation on an icon of the drawer menu (contact of the finger or the like with a position at which the icon is displayed) (step S104).

When the manipulation detection unit 120 detects the manipulation on the icon of the drawer menu (the contact of the finger or the like with the position at which the icon is displayed), the information processing device 100 executes a process in which thumbnail images of content saved in a save source corresponding to the manipulated icon are arranged in a circular arc shape outside the drawer menu and displayed on the display unit 140 (step S105). The user can use the content by performing the manipulation on the thumbnail images opened in the circular arc shape (for example, a drag-and-drop manipulation on the thumbnail images by the user).

The information processing device 100 according to an embodiment of the present disclosure enables the user to easily use content by operating the content browsing application as described above.

An example of an operation of the information processing device 100 according to the embodiment of the present disclosure has been described above. Next, an example of a user interface displayed on the display unit 140 according to execution of the content browsing application in the information processing device 100 according to the embodiment of the present disclosure will be described.

[Example of User Interface Displayed by Information Processing Device]

FIG. 3 is an explanatory diagram illustrating an example of the user interface displayed on the display unit 140 according to the execution of the content browsing application. In FIG. 3, an example of the user interface displayed on the display unit 140 immediately after the content browsing application is activated by the control unit 130 is illustrated.

In the following description, the user is assumed to manipulate the content browsing application to be executed by the information processing device 100 by touching the display unit 140 equipped with a touch panel with the finger, the stylus pen, or the like. In addition, in the following description, the selection is assumed to indicate any of a touch manipulation, a tap manipulation, or a double-tap manipulation on the display unit 140 performed by the user with the finger, the stylus pen, or the like.

In addition, hereinafter, the control unit 130 is assumed to execute the display of information on the display unit 140 by the content browsing application when the content browsing application is executed and the manipulation detection unit 120 is assumed to detect the manipulation on the information displayed on the display unit 140 by the content browsing application.

In FIG. 3, a state in which only parts of the thumbnail images are displayed as image display regions U1*a* and U1*b* around the centers of opposite sides of the display unit 140 immediately after the content browsing application is activated is illustrated. Also, in the following description, the information processing device 100 is assumed to execute the content browsing application.

The image display regions U1*a* and U1*b* are regions provided to show the user a place in which the swipe manipulation, that is, a slide manipulation by the finger in a direction of a dashed-line arrow of FIG. 3, is received. When the user of the information processing device 100 performs the swipe manipulation from the image display regions U1*a* and U1*b* on the display unit 140, the drawer menu can be displayed on the display unit 140 of the information processing device 100. A display standard of the thumbnail images displayed in the image display regions U1*a* and U1*b* will be described below.

FIG. 4A is an explanatory diagram illustrating an example of the user interface displayed on the display unit 140 according to the execution of the content browsing application. In FIG. 4A, an example of a user interface displayed on the display unit 140 when the user executes the swipe manipulation from the image display region U1*a* from the state of FIG. 3 is illustrated.

When the user of the information processing device 100 performs the swipe manipulation from the image display regions U1*a* and U1*b* displayed by the content browsing application on the display unit 140, the content browsing application displays a drawer menu U2*a* in which a plurality of icons are arranged in a circular arc shape around the center of a side on which the swipe manipulation is performed on the display unit 140 as illustrated in FIG. 4A.

This drawer menu U2*a* is a menu in which a content save source is indicated by an icon. When it is detected that the user of the information processing device 100 has touched a position at which the icon displayed as the drawer menu U2*a* is displayed with a finger or the like, the content browsing application opens thumbnails of content saved in a save source corresponding to the touched icon outside the drawer menu U2*a* to display the opened thumbnails on the display unit 140.

When the icons included in the drawer menu U2*a* are displayed according to the user's swipe manipulation, the content browsing application may simultaneously display all the icons if the swipe manipulation is performed or may perform animation display to first display one icon and perform opening from the one icon in the circular arc shape if the swipe manipulation is performed.

Also, it is needless to say that the number of icons included in the drawer menu U2*a* is not limited to the example illustrated in FIG. 4A, and icons to be included in the drawer menu U2*a* can be displayed according to the number of content save sources.

For example, there are a predetermined directory of a storage device (for example, the storage unit 150) inside the information processing device 100, a predetermined directory of a recording medium connected to the information processing device 100, a social networking service (SNS), a Web service on the Internet, and the like as the content save source.

In the drawer menu U2*a*, an icon indicating each of the content save sources is displayed. Also, when the user selects a predetermined directory as the content save source, the content browsing application may display a directory subordinate to the relevant directory or a directory for every type of content in the drawer menu U2*a*.

FIG. 4B is an explanatory diagram illustrating an example of the user interface displayed on the display unit 140 according to the execution of the content browsing application. In FIG. 4B, an example of a user interface displayed on the display unit 140 when the user has selected the predetermined directory as the content save source is illustrated.

When the user selects the predetermined directory as the content save source, the content browsing application displays a directory display region U21*a* as illustrated in FIG. 4B. In the example illustrated in FIG. 4B, the content browsing application displays an image directory, a video directory, and a music directory in the directory display region U21*a*.

FIG. 4C is an explanatory diagram illustrating an example of the user interface displayed on the display unit 140 according to the execution of the content browsing application. In FIG. 4C, an example of a user interface displayed on the display unit 140, for example, when the user has selected any one of the image directory, the video directory, and the music directory illustrated in FIG. 4B as the content save source, is illustrated.

When the user selects any one of the image directory, the video directory, and the music directory, the content browsing application displays a folder display region U22*a* in which a folder located in the selected directory is displayed as illustrated in FIG. 4C. In addition, the content browsing application displays a save source icon U4*a* indicating which save source is selected at present as illustrated in FIG. 4C.

FIG. 5 is an explanatory diagram illustrating an example of the user interface displayed on the display unit 140 according to the execution of the content browsing application. In FIG. 5, an example of a user interface displayed on the display unit 140 when the user of the information processing device 100 has performed a manipulation of touching an icon in the drawer menu U2*a* is illustrated.

When it is detected that the user of the information processing device 100 has performed the manipulation of touching one icon in the drawer menu U2*a*, the content browsing application displays a thumbnail image display region U3*a* in which thumbnail images of content saved in the save source corresponding to the icon are arranged in the circular arc shape around the center of the side on which the swipe manipulation is performed on the display unit 140 as illustrated in FIG. 5. In addition, when it is detected that the user has performed the manipulation of touching one icon in the drawer menu U2*a*, the content browsing application displays a save source icon U4*a* indicating which save source is selected by the user at present.

The thumbnail image displayed in the thumbnail image display region U3*a*, for example, is a thumbnail image obtained by reducing a still image when the content is the still image, a thumbnail image obtained by reducing a scene extracted as a representative scene of a moving image when the content is the moving image, a thumbnail image obtained by reducing a jacket image of music when the content is the music, or the like. In addition, when the content is document files such as PDF files, the thumbnail image displayed in the thumbnail image display region U3a, for example, is an icon indicating the files.

When thumbnail images are displayed in the thumbnail image display region U3a, the content browsing application may simultaneously display the thumbnail images if a manipulation of touching a certain icon of the drawer menu U2a is performed or may perform animation display to first display one thumbnail image and perform opening in the circular arc shape by using the one thumbnail image as the origin if the touch manipulation is performed.

Thumbnail images to be initially displayed in the thumbnail image display region U3a, for example, are arranged in ascending order of file names of content. When the user of the information processing device 100 performs a manipulation of sliding along the thumbnail image display region U3a with the finger (for example, a manipulation of sliding with the finger in a direction of a dashed-line arrow of FIG. 5), the content browsing application executes a process of moving the thumbnail image displayed in the thumbnail image display region U3a according to the manipulation.

When the user performs a manipulation of touching a position at which the thumbnail image is displayed with the finger or the like and separating the finger or the like from the display unit 140 after moving the finger or the like to the center of the display unit 140 while the contact state is maintained (that is, a drag-and-drop manipulation on the thumbnail image of the content), the information processing device 100 executes a process of displaying the content corresponding to the thumbnail image on the display unit 140 in the control unit 130. Also, the content browsing application may limit a range in which the user can perform the drag-and-drop manipulation on the thumbnail image of the content to only the outside of the thumbnail image display region U3a when viewed from the drawer menu U2a.

FIG. 6 is an explanatory diagram illustrating an example of the user interface displayed on the display unit 140 according to the execution of the content browsing application. In FIG. 6, an example of a user interface displayed on the display unit 140 when the user of the information processing device 100 has performed the drag-and-drop manipulation on the thumbnail image of the content with respect to the thumbnail image displayed in the thumbnail image display region U3a is illustrated.

When the user of the information processing device 100 has performed the drag-and-drop manipulation on the thumbnail image displayed in the thumbnail image display region U3a, the content browsing application displays content corresponding to the thumbnail image on the display unit 140 as illustrated in FIG. 6. Also, while the user performs the drag manipulation on the thumbnail image, the content browsing application executes a process of directly displaying the thumbnail image on the display unit 140 in the control unit 130.

In addition, the content browsing application may make a determination so that a size of content to be displayed on the display unit 140 when the user separates his/her hand from the thumbnail image becomes an appropriate size according to the resolution of the content if the content is a still image or a moving image.

Also, a place in which the content is displayed according to the drag-and-drop manipulation of the user of the information processing device 100 is also referred to as a "table" in this embodiment. The content browsing application to be executed by the control unit 130 enables a manipulation such as enlargement, reduction, rotation, movement, reproduction, edition, or saving of content displayed on the table according to the drag-and-drop manipulation of the user.

In addition, the content browsing application to be executed by the control unit 130 can execute control for displaying a file name of content, a title, information about a shooting location when the content is a still image or a moving image, and other additional information with content displayed on the table according to the user's drag-and-drop manipulation on the thumbnail image. Also, the content browsing application to be executed by the control unit 130 may display the shooting location in latitude and longitude values when information about the shooting location is displayed as the additional information with the content or display the name of the location by converting the latitude and longitude values into the name of the location.

In addition, the content browsing application to be executed by the control unit 130 can receive a manipulation of enlarging content displayed on the table to display the enlarged content according to the user's drag-and-drop manipulation. For example, when the user executes a double-tap manipulation or another predetermined manipulation on any content displayed on the table, the content browsing application executes a process of displaying content serving as a manipulation target in a larger size.

Also, the content browsing application to be executed by the control unit 130 may be limited so that the drag-and-drop manipulation is not enabled again in a state in which corresponding content is displayed on the table according to the drag-and-drop manipulation on each thumbnail image. For example, as illustrated in FIG. 6, the control unit 130 can control the thumbnail image of the content displayed on the table to be darkly displayed within the thumbnail image displayed in the thumbnail image display region U3a in a state in which the content is displayed on the table according to the drag-and-drop manipulation. Then, the control unit 130 can control the darkly displayed thumbnail image so that the drag-and-drop manipulation for the table is not received.

The information processing device 100 executes a process of deleting the drawer menu U2a and the thumbnail image display region U3a from the display unit 140 according to the user's swipe manipulation in a direction opposite to that in which the drawer menu U2a is displayed in the control unit 130. When the drawer menu U2a and the thumbnail image display region U3a are deleted, the information processing device 100 executes a process of displaying the image display regions U1a and U1b as illustrated in FIG. 3 on the display unit 140 in the control unit 130.

For the thumbnail image to be displayed in the image display region U1a, the thumbnail image on which the user has performed the drag-and-drop manipulation before the drawer menu U2a and the thumbnail image display region U3a are deleted can be selected. Also, when there is no thumbnail image on which the user has performed the drag-and-drop manipulation before the drawer menu U2a and the thumbnail image display region U3a are deleted such as when the content browsing application is initially activated, the content browsing application can show the user where a manipulation is possible by illuminating the image display region U1a instead of the thumbnail image.

Only the thumbnail image display region U3a is displayed in FIG. 6, but a thumbnail image display region can be similarly displayed according to a swipe manipulation even on opposite sides of the display unit 140. The content browsing application can allow two users to simultaneously perform the drag-and-drop manipulation on the thumbnail image displayed in the thumbnail image display region.

In thumbnail images displayed in opposite thumbnail image display regions, the case in which the same thumbnail image is included is considered according to a state of selection of a content save source by each user or a manipulation state for the thumbnail image display region. If one user performs the drag-and-drop manipulation on the thumbnail image when the same thumbnail image is displayed in the opposite thumbnail image display regions, control can be performed so that the drag-and-drop manipulation on the thumbnail image displayed in the thumbnail image display region of the other user side is not received as described above.

Next, an example of a menu other than the drawer menu displayed by the content browsing application is shown.

FIG. 7 is an explanatory diagram illustrating an example of the user interface displayed on the display unit 140 according to the execution of the content browsing application. In FIG. 7, an example of a menu displayed on the display unit 140 according to the user's manipulation is illustrated.

When the user rapidly executes a manipulation in which a finger or the like comes in contact with any position of the display unit 140 twice (a so-called double-tap manipulation), the information processing device 100 executes a process of displaying a menu U5 around the position on the display unit 140 with which the user came in contact in the control unit 130.

The menu U5 illustrated in FIG. 7 includes a button U5a for deleting the menu U5, a button U5b for displaying a menu for changing a display form of content, a button U5c for displaying a menu for changing a background, a button U5d for saving the display form of the content as a library, a button U5e for calling the saved library, a button U5f for saving the display form of the content in the form of Portable Document Format (PDF), and a button U5g for displaying the drawer menu.

As described above, the control unit 130 controls display of the menu U5 displayed on the display unit 140 according to the user's double-tap manipulation so that the buttons U5b to U5g are disposed at equivalent intervals on the circumference of a circle around the button 5a. In addition, when the user performs a manipulation on the button U5a for deleting the menu U5, the control unit 130 executes a process of deleting the entire menu U5 displayed on the display unit 140. Also, when no manipulation has been performed on the menu U5 for a predetermined time after the menu U5 is displayed on the display unit 140, the control unit 130 may execute the process of deleting the entire menu U5 displayed on the display unit 140 from the display unit 140.

Also, the menu U5 illustrated in FIG. 7 may be configured to be displayed by a contact manipulation of the user's finger at any position for a predetermined time or more (a long pressing manipulation) rather than the user's double-tap manipulation. In addition, the number of buttons to be displayed as the menu U5 is not limited to six. In addition, even when the number of buttons to be displayed as the menu U5 changes, the control unit 130 may control the display so that the buttons are disposed just above the button U5a when viewed from the button U5a.

In addition, the content browsing application may display a plurality of menus U5s as well as one menu U5 as the menu U5 illustrated in FIG. 7. In addition, the content browsing application may display the buttons of the menu U5 illustrated in FIG. 7 in the same direction for any manipulation or may detect a form of the user's fingers in the manipulation detection unit 120 and display the buttons in an appropriate direction according to the form of the fingers.

Figure 8:
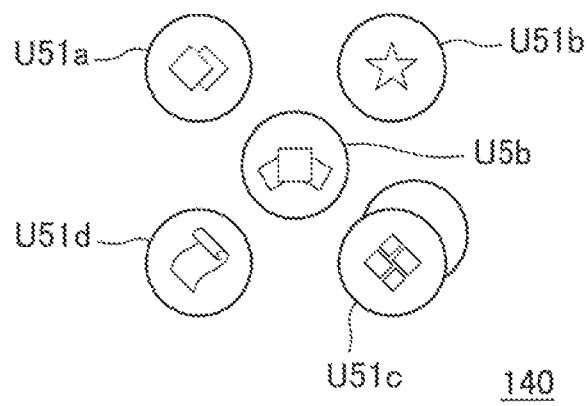
FIG. 8 is an explanatory diagram illustrating an example of a user interface.

FIG. 8 is an explanatory diagram illustrating an example of the user interface displayed on the display unit 140 according to the execution of the content browsing application. In FIG. 8, an example of a menu displayed on the display unit 140 when the user touches the button U5b for displaying the menu for changing the display form of the content with the finger or the like is illustrated.

In FIG. 8, a state in which buttons U51a to U51d are displayed on the circumference around the button U5b on the display unit 140 when the user has touched the button U5b with the finger or the like is illustrated. Buttons U51a to U52d are buttons for switching the display form (hereinafter also referred to as a "view") of the content.

For example, the button U51a is a button for performing display in which the content is classified and content having the same type or attribute is stacked. A display form to be displayed to classify and stack the content is also referred to as a "stack view" in this embodiment. The button U51b is a button for displaying content designated as the user's favorite content on the display unit 140.

In addition, the button U51c is a button for displaying content on the display unit 140 so that the content is arranged on a plane. The button U51d is a button for displaying content on the display unit 140 so that the content is arranged on a map. A display form in which the content is arranged on the map and displayed is also referred to as a "map view" in this embodiment. When the content is arranged on the map, the control unit 130 executes a process of arranging the content so that the content is displayed in a shooting location of the content.

Also, after the buttons U51a to U51d are displayed on the display unit 140, the control unit 130 may execute a process of deleting the entire menu U5 including the buttons U51a to U51d displayed on the display unit 140 from the display unit 140 when no manipulation has been performed on any one of the buttons U51a to U51d for a predetermined time.

Figure 9:
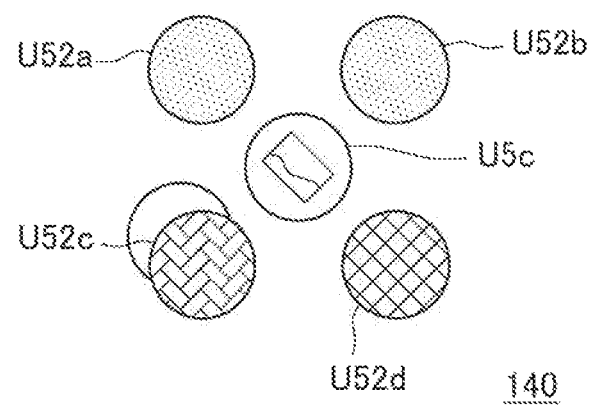
FIG. 9 is an explanatory diagram illustrating an example of a user interface.

FIG. 9 is an explanatory diagram illustrating an example of the user interface displayed on the display unit 140 according to the execution of the content browsing application. In FIG. 9, an example of a menu displayed on the display unit 140 when the user touches the button U5c for displaying the menu for changing the background with the finger or the like is illustrated.

In FIG. 9, a state in which buttons U52a to U52d are displayed on the circumference around the button U5d on the display unit 140 when the user has touched the button U5d with the finger or the like is illustrated.

For example, all the buttons U52a to U52d are for changing the background of the content browsing application. When the user executes a manipulation of selecting the buttons U52a to U52d (for example, a manipulation of touching a position at which the buttons U52a to U52d are displayed with the finger or the like), the control unit 130 executes a process of changing the background of the content browsing application to a background corresponding to the selected button.

Also, after the buttons U52a to U52d are displayed on the display unit 140, the control unit 130 may execute a process of deleting the entire menu U5 including the buttons U52a to U52d displayed on the display unit 140 from the display unit 140 when no manipulation has been performed on any one of the buttons U52a to U52d for a predetermined time.

The content browsing application to be executed by the information processing device 100 can arrange and display a plurality of pieces of content according to the user's manipulation. The content browsing application can simply arrange the plurality of pieces of content according to the user's drag manipulation. However, because content displayed on the table is different in a size or a rotation state, a process of allowing the user to perform a manipulation of aligning a direction or a size degrades manipulability for the user.

Therefore, the content browsing application to be executed by the information processing device 100 allows the user to perform an operation of causing content to collide in order to arrange and display a plurality of pieces of content. According to the operation of causing the content to collide, the content browsing application proceeds to a mode in which the colliding content is arranged and displayed. The content browsing application can improve the manipulability for the user by arranging and displaying the colliding content according to the operation of causing the content to collide.

Figure 10:
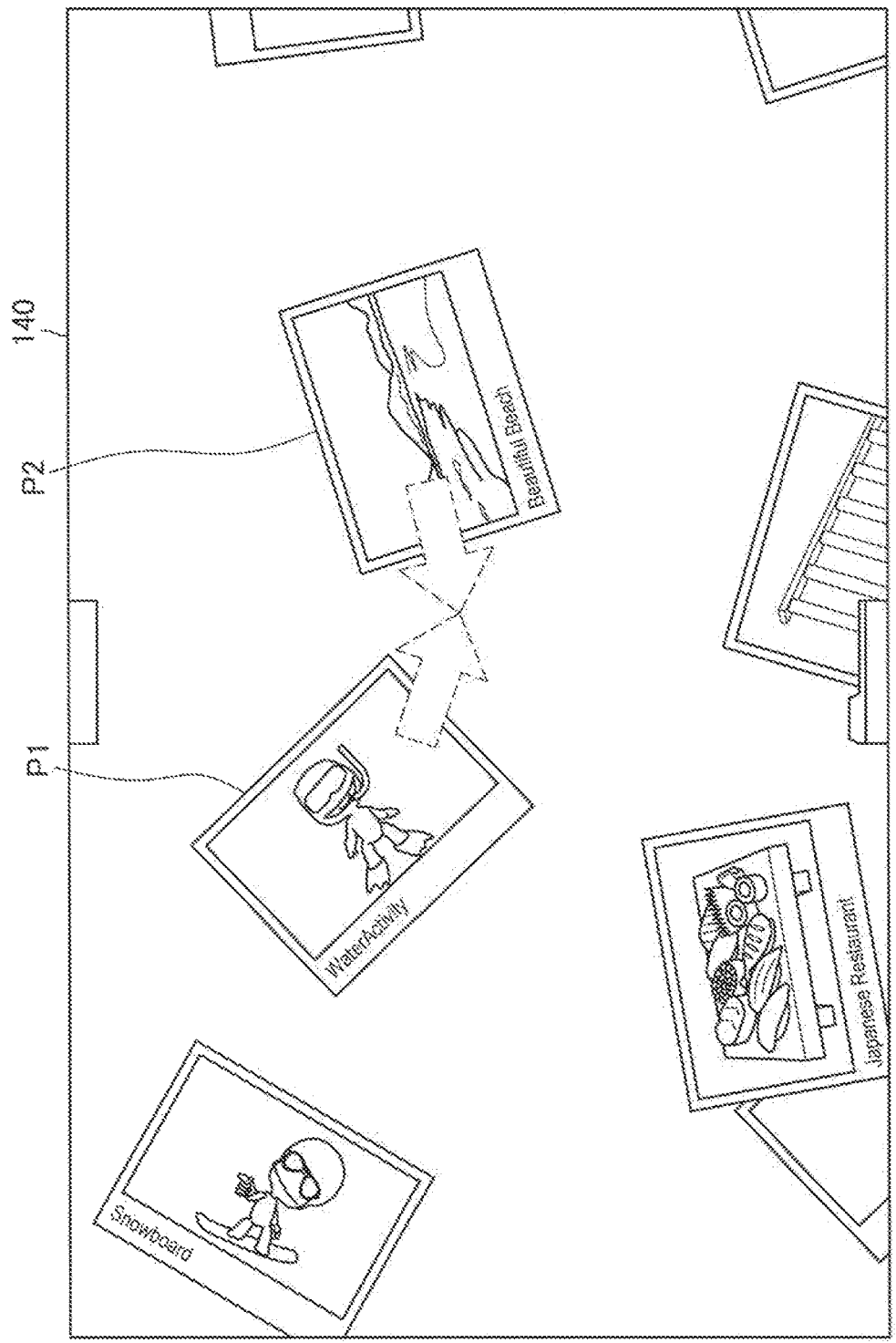
FIG. 10 is an explanatory diagram illustrating an example of a user interface.

FIG. 10 is an explanatory diagram illustrating an example of the user interface displayed on the display unit 140 according to the execution of the content browsing application. In FIG. 10, an example of a state in which the content browsing application allows the user to perform an operation of causing content displayed on the table to collide in order to arrange and display a plurality of pieces of content is illustrated.

For example, the user performs drag manipulations on two pieces of content P1 and P2 in arrow directions of the drawing to arrange and display the two pieces of content P1 and P2 displayed on the table, so that the two pieces of content P1 and P2 are caused to collide with each other. The manipulation detection unit 120 detects that a manipulation of causing the two pieces of content P1 and P2 to collide with each other has been performed and the control unit 130 executes a process of arranging the two pieces of content P1 and P2 according to the collision of the two pieces of content P1 and P2 and displaying the arranged content P1 and P2 on the display unit 140.

Figure 11:
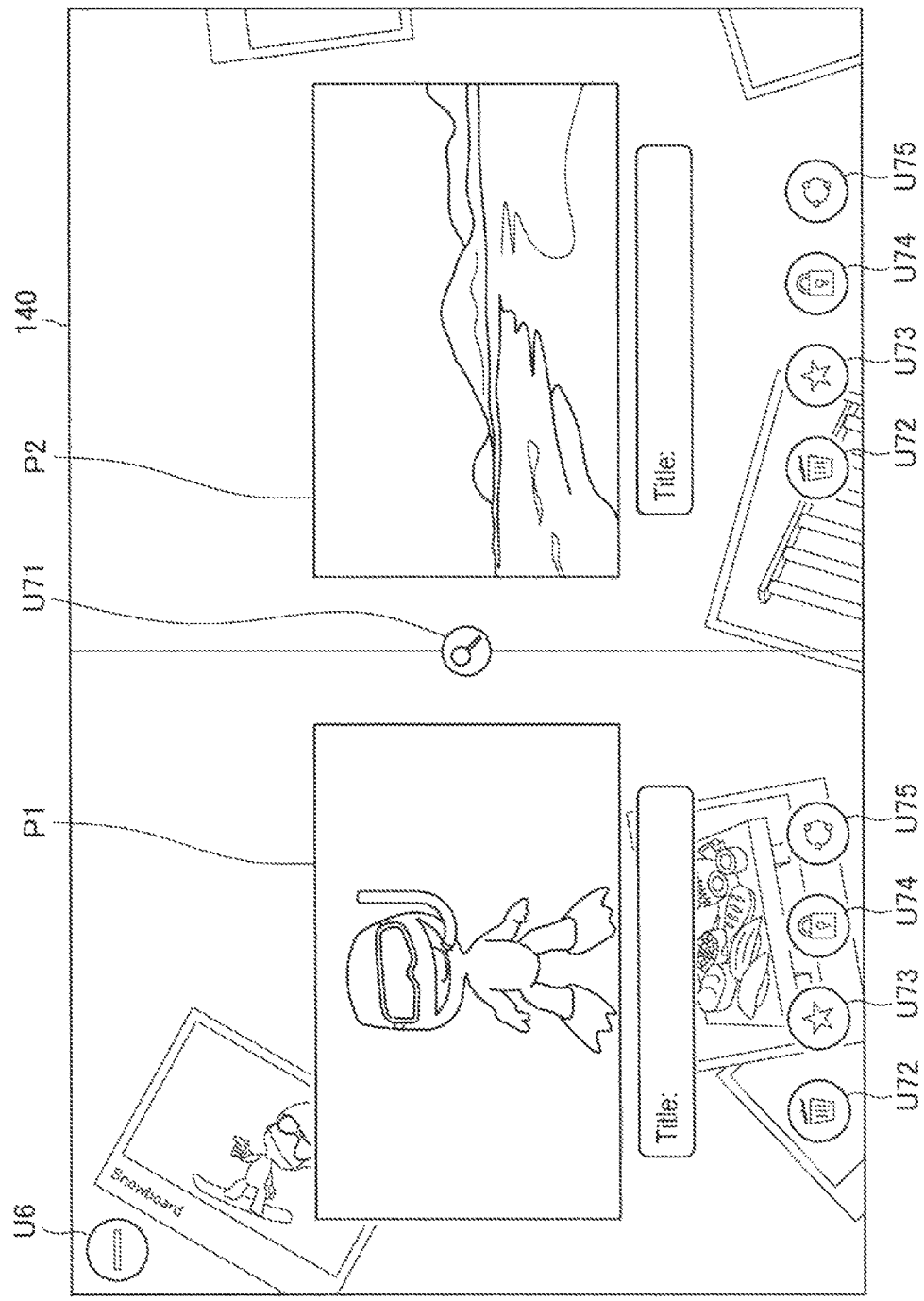
FIG. 11 is an explanatory diagram illustrating an example of a user interface.

FIG. 11 is an explanatory diagram illustrating an example of the user interface displayed on the display unit 140 according to the execution of the content browsing application. In FIG. 11, an example in which the two pieces of content P1 and P2 are arranged and displayed on the display unit 140 according to the collision of the two pieces of content P1 and P2 through the user's drag manipulation is illustrated.

When the manipulation detection unit 120 detects that the two pieces of content P1 and P2 collide with each other through the user's drag manipulation, the content browsing application executes a process of displaying a screen on which the two pieces of content P1 and P2 are arranged and displayed as illustrated in FIG. 11. When the screen on which the two pieces of content P1 and P2 are arranged and displayed is displayed, the content browsing application causes the content P1 and P2 to be displayed on a front surface and causes the other content (that is, content other than the content P1 and P2) to be semi-transparently displayed behind the content P1 and P2. This is a state in which only the content P1 and P2 can be manipulated and no other content is manipulated.

In addition, when the screen on which the content P1 and P2 is arranged and displayed is displayed on the display unit 140, the content browsing application displays a button U6 for deleting the screen on which the content P1 and P2 is arranged and displayed. In addition, when the screen on which the content P1 and P2 is arranged and displayed is displayed on the display unit 140, the content browsing application displays a button U71 for displaying metadata of the content P1 and P1, a button U72 for deleting data of the content, a button U73 for registering content as favorite content, a button U74 for locking the content (so that the content is not deleted), and a button U75 for copying the content.

When the screen on which the content P1 and P2 is arranged and displayed is displayed as illustrated in FIG. 11, the content browsing application executes a process of displaying associated information of the content on a table. The associated information, for example, can include a file name of the content, a title, information about a shooting location or the like when the content is a still image or a moving image, a URL of a Web page if the content is obtained by clipping the Web page, etc.

In a state in which the screen on which the content P1 and P2 is arranged and displayed is displayed as illustrated in FIG. 11, the content browsing application executes a process for the selected content according to a type of content when it is detected that the user has executed a manipulation of selecting either of the pieces of content. For example, the control unit 130 executes a process of enlarging a still image to display the enlarged still image when the content is the still image, a process of reproducing a moving image when the content is the moving image, a process of reproducing music when the content is the music, and a process of accessing a Web page when there is a clipping of the Web page.

When the screen on which the content P1 and P2 is arranged and displayed is displayed as illustrated in FIG. 11, the content browsing application can perform a process of registering the content as favorite content, a processing of locking the content to prevent the content from being deleted, and a process of deleting the content, etc. When the screen on which the content P1 and P2 is arranged and displayed is displayed as illustrated in FIG. 11, the content browsing application may simultaneously display buttons for displaying metadata of the displayed content P1 and P2.

The content browsing application may animate the two pieces of content P1 and P2 until the content browsing application proceeds to a mode in which the content P1 and P2 is arranged and displayed after the two pieces of content P1 and P2 come in contact with each other. The content browsing application may perform animation on the content P1 and P2, for example, according to display control for gradually enlarging an image for each of the two pieces of content P1 and P2 disposed on the table and display control for controlling a rotation operation by gradually tilting a rotation axis to be horizontal in a longitudinal direction of the screen while performing rotation using a centerline for bisecting the longitudinal direction of the image as an axis. The content browsing application ultimately proceeds to the mode in which the content P1 and P2 is arranged and displayed as illustrated in FIG. 11 while performing animation on the content P1 and P2.

Assuming that a drag manipulation is performed on two pieces of content as the condition for performing the transition to the screen on which the two pieces of content are arranged and displayed as in FIG. 11, the content browsing application, for example, may perform the transition unconditionally when the two pieces of content come in contact, perform the transition when contact is made at an angle of a movement direction of the two pieces of content greater than or equal to a predetermined angle, and perform the transition when contact is made at a relative movement speed of the two pieces of content greater than or equal to a predetermined speed.

In addition, even when one piece of the content between the two pieces of content to be selected by the user is not moved by the user, the content browsing application may transition to the screen on which the two pieces of content are arranged and displayed as in FIG. 11 when the two pieces of content come in contact, when the two pieces of content come in contact at the angle of the movement direction greater than or equal to the predetermined angle, or when the two pieces of content come in contact at the relative movement speed greater than or equal to the predetermined speed.

Also, an example in which the transition to the screen on which the two pieces of content are arranged and displayed is performed when the user executes a manipulation of causing the two pieces of content to collide with each other is shown in this embodiment, but the content browsing application may similarly transition to the screen on which the colliding content is arranged and displayed even when the user executes a manipulation of causing three or more pieces of content to collide with one another.

In addition, an example of the transition to the screen on which two pieces of content are arranged and displayed when the user executes a manipulation of causing the two pieces of content to collide with each other is shown in this embodiment, but a process to be performed when the user executes the manipulation of causing the two pieces of content to collide with each other in the present disclosure is not limited to this example. For example, when the user executes the manipulation of causing the two pieces of content to collide with each other, the content browsing application may execute a morphing process using the two pieces of content, execute a process of grouping the two pieces of content, or a process of combining and synthesizing the two pieces of content in a mosaic pattern.

When the user performs a manipulation of selecting the button U6 illustrated in FIG. 11, the content browsing application causes the screen to transition from a state in which two pieces of content are arranged and displayed to an original state (a state before the user caused the two pieces of content to collide with each other). At this time, the content browsing application displays the two arranged and displayed pieces of content at their positions immediately before the collision by the user.

Figure 12:
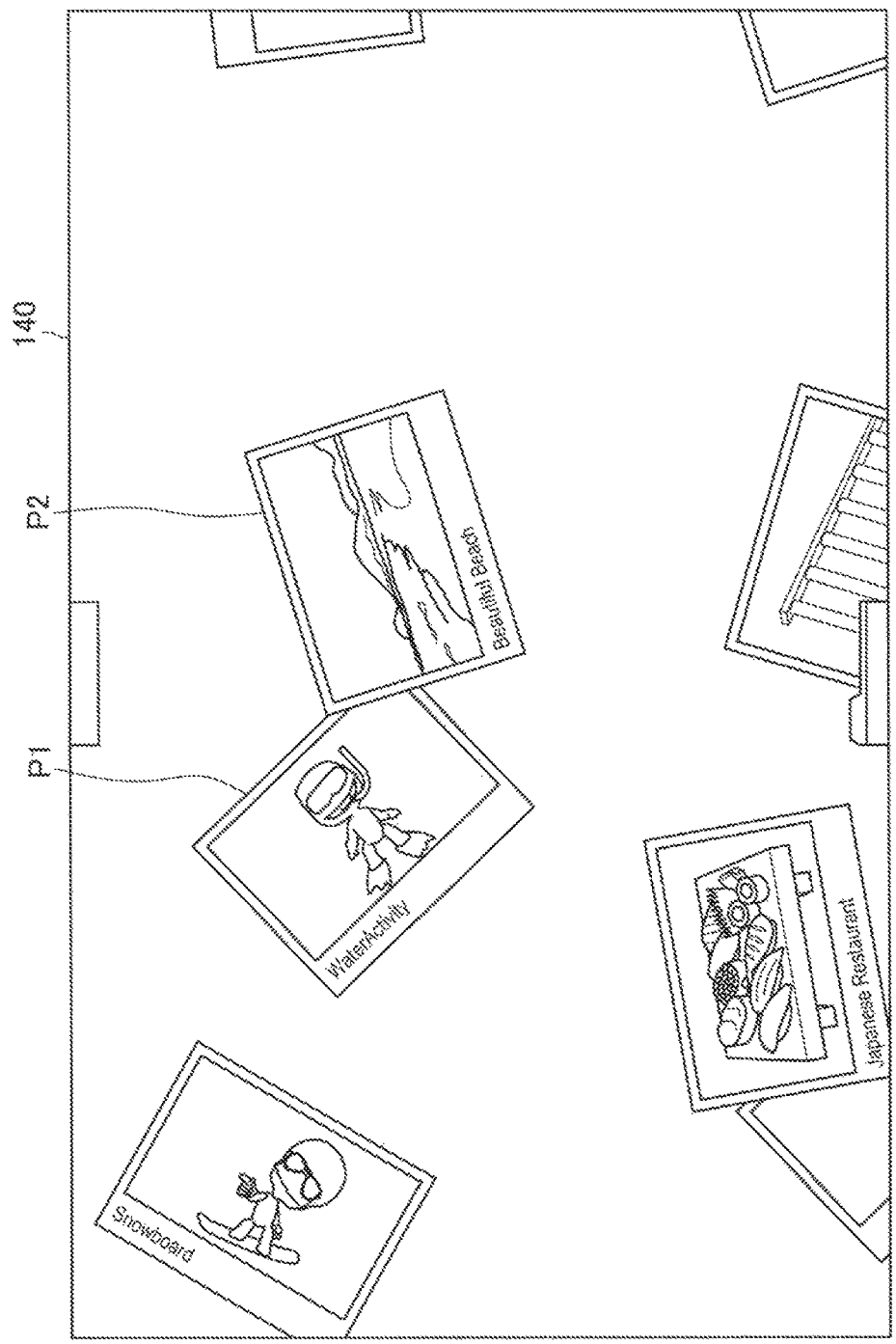
FIG. 12 is an explanatory diagram illustrating an example of a user interface.

FIG. 12 is an explanatory diagram illustrating an example of a user interface displayed on the display unit 140 according to execution of the content browsing application. In FIG. 12, an example of a user interface by the content browsing application when the user selects the button U6 from the state illustrated in FIG. 11 is illustrated. When the user performs a manipulation of selecting the button U6 as described above, the content browsing application displays the two pieces of content which are arranged and displayed at their positions immediately before collision by the user.

The content browsing application can provide a manipulation (hereinafter also referred to as a sweep manipulation) for integrating a plurality of pieces of content displayed on the table into one pile. This manipulation will be described.

Figure 13:
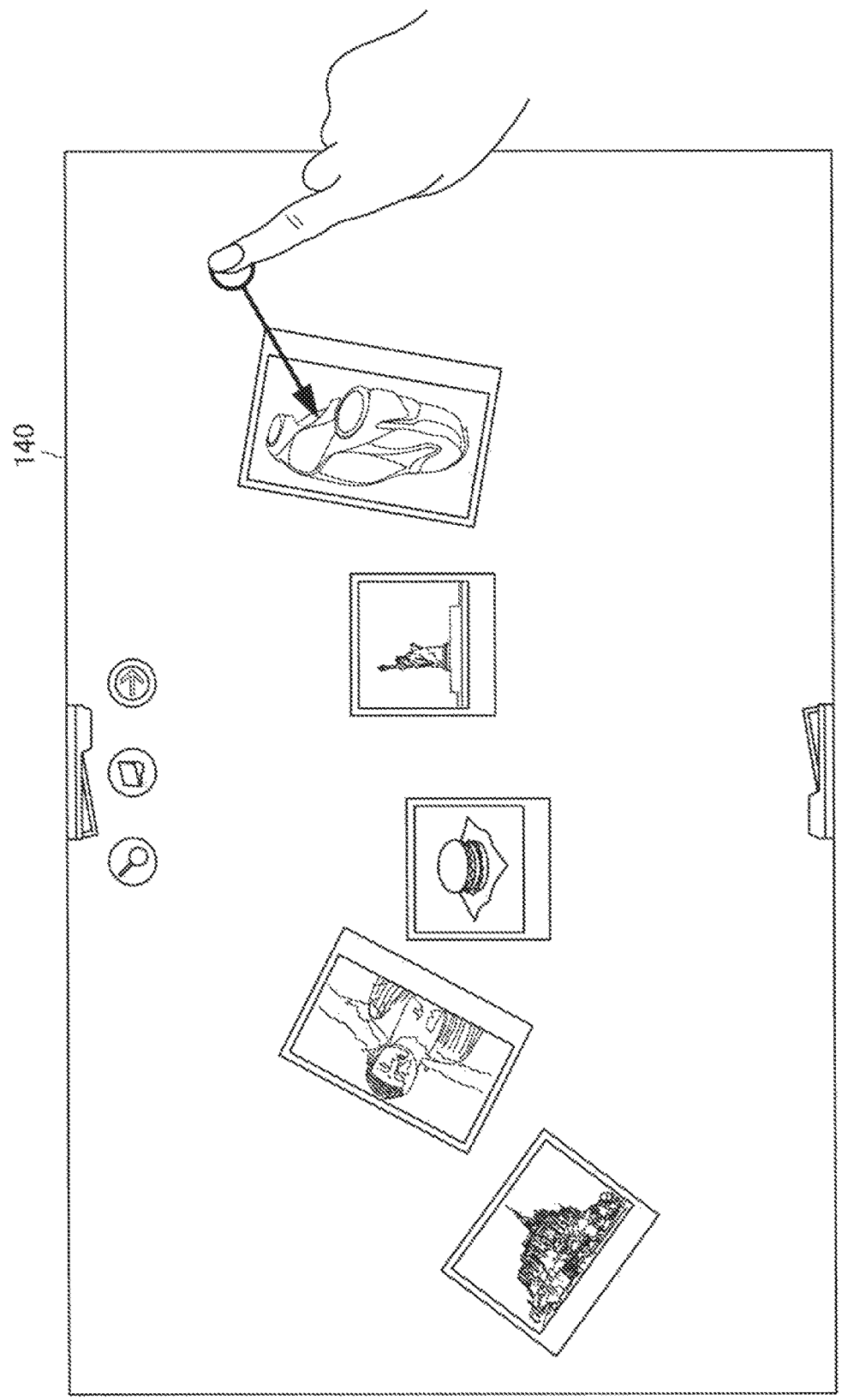
FIG. 13 is an explanatory diagram illustrating an example of a user interface.
Figure 14:
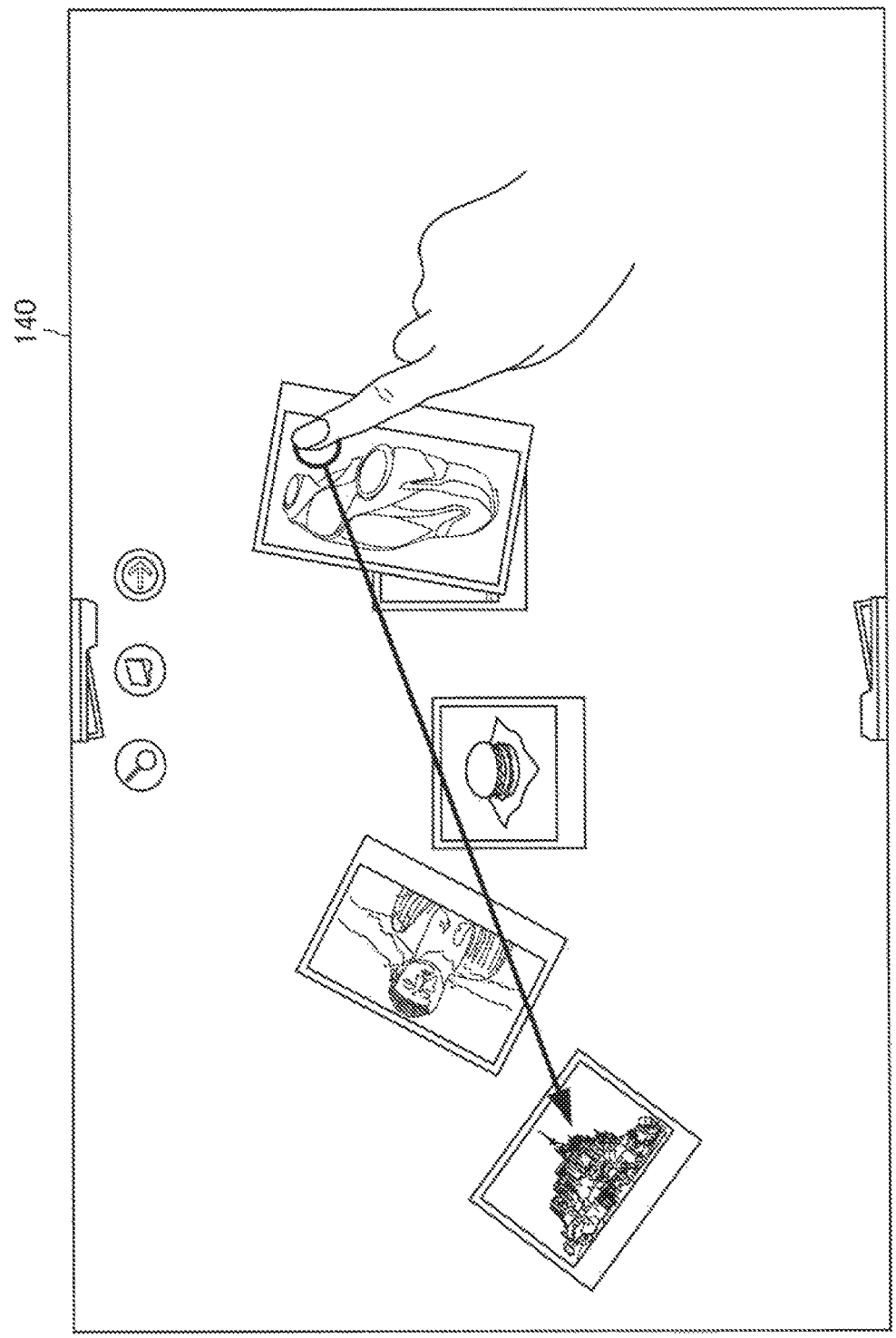
FIG. 14 is an explanatory diagram illustrating an example of a user interface.
Figure 15:
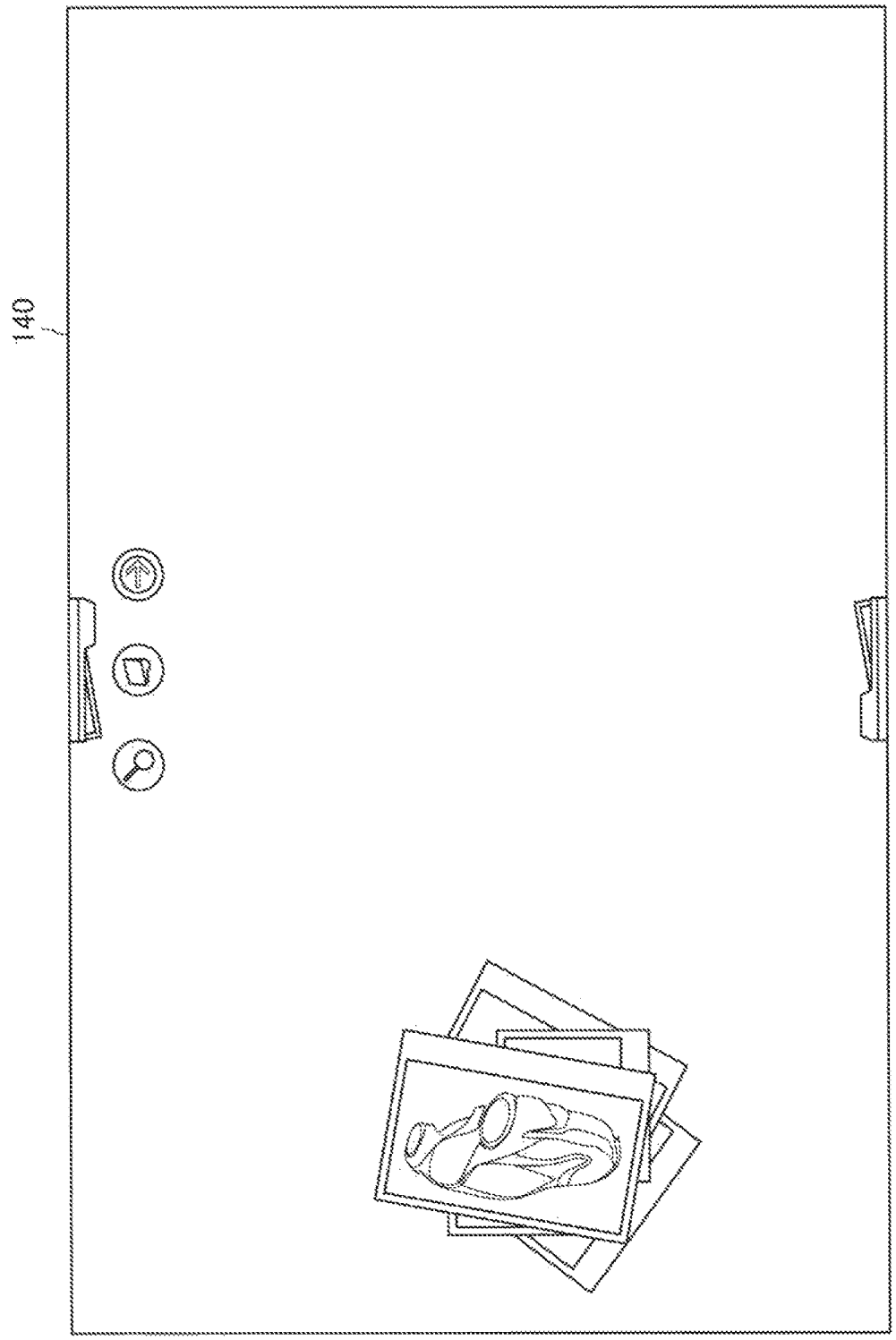
FIG. 15 is an explanatory diagram illustrating an example of a user interface.

FIGS. 13 to 15 are explanatory diagrams illustrating an example of the user interface displayed on the display unit 140 according to the execution of the content browsing application. In FIGS. 13 to 15, an example of a user interface when the user executes the sweep manipulation on the table to integrate a plurality of pieces of content displayed on the table into one is illustrated.

As illustrated in FIG. 13, the user of the information processing device 100 executes a manipulation of selecting any point of a region in which content on the table is not displayed, that is, a touch manipulation using a finger. Thereafter, when the user performs the sweep manipulation by moving the finger in an arrow direction of FIG. 13 in a touched state, the content browsing application executes a process of integrating a plurality of pieces of content displayed on the table into one as illustrated in FIG. 14. When the content is integrated, the content browsing application may integrate the content so that the content first touched by the user is placed on the top.

When all five pieces of content illustrated in FIG. 13 are integrated into one pile, the display of the table is in the state illustrated in FIG. 15. The content browsing application can integrate the content placed on the table into one pile to display the integrated content according to the sweep manipulation of the user as described above.

Also, the content browsing application may maintain a rotation state of the content to be integrated when the user performs the sweep manipulation and cause rotation to be performed based on the relationship between the user's manipulation direction and the balance of the content.

In order to move the entire content integrated into one pile as in FIG. 15 to another position, the content browsing application allows the user to perform the sweep manipulation in a direction of the content in a touched state after allowing the user to perform a manipulation of touching any point in a region in which the content on the table is not displayed with the finger as in the swipe manipulation.

In addition, in order to move uppermost content from the content integrated into one pile as in FIG. 15 to another position on the table, the content browsing application allows the user to perform a drag manipulation after allowing the user to perform a manipulation of touching the pile of content. According to this manipulation, the content browsing application can move the uppermost content from the content integrated into one pile to another position on the table.

The content browsing application can save the state of the table in which the content is arranged by the user and reproduce the state of the table. Hereinafter, an example of a user interface of the content browsing application when the state of the table on which the content is arranged by the user is saved and reproduced will be described.

FIGS. 16 to 19 are explanatory diagrams illustrating examples of the user interface displayed on the display unit 140 according to the execution of the content browsing application.

Figure 16:
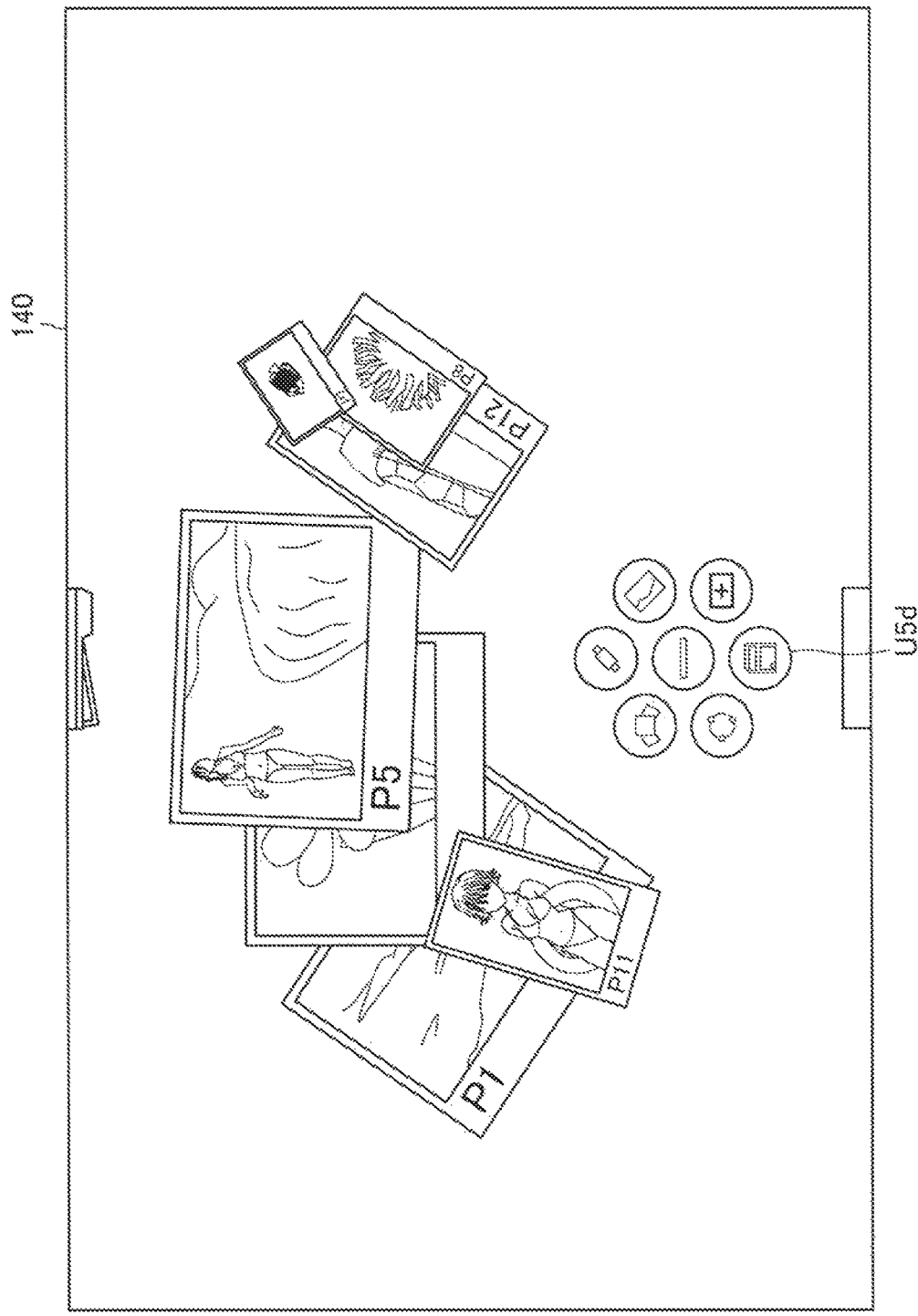
FIG. 16 is an explanatory diagram illustrating an example of a user interface.

First, an example of a user interface when the state of the table on which the content is arranged by the user is saved is shown. In FIG. 16, an example of a user interface of the content browsing application when the state of the table on which the content is arranged by the user is saved is illustrated.

When the user executes a manipulation of rapidly touching any position of the display unit 140 with the finger or the like twice (a so-called double-tap manipulation) as described above, the information processing device 100 executes a process of displaying a menu U5 around the position touched by the user on the display unit 140 in the control unit 130. When the user selects the button U5*d* for saving the display state of the content as the library within the menu U5, the content browsing application displays a screen for asking the user whether to save the state of the table at a point in time at which the user selected the button U5*d* as the library.

Figure 17:
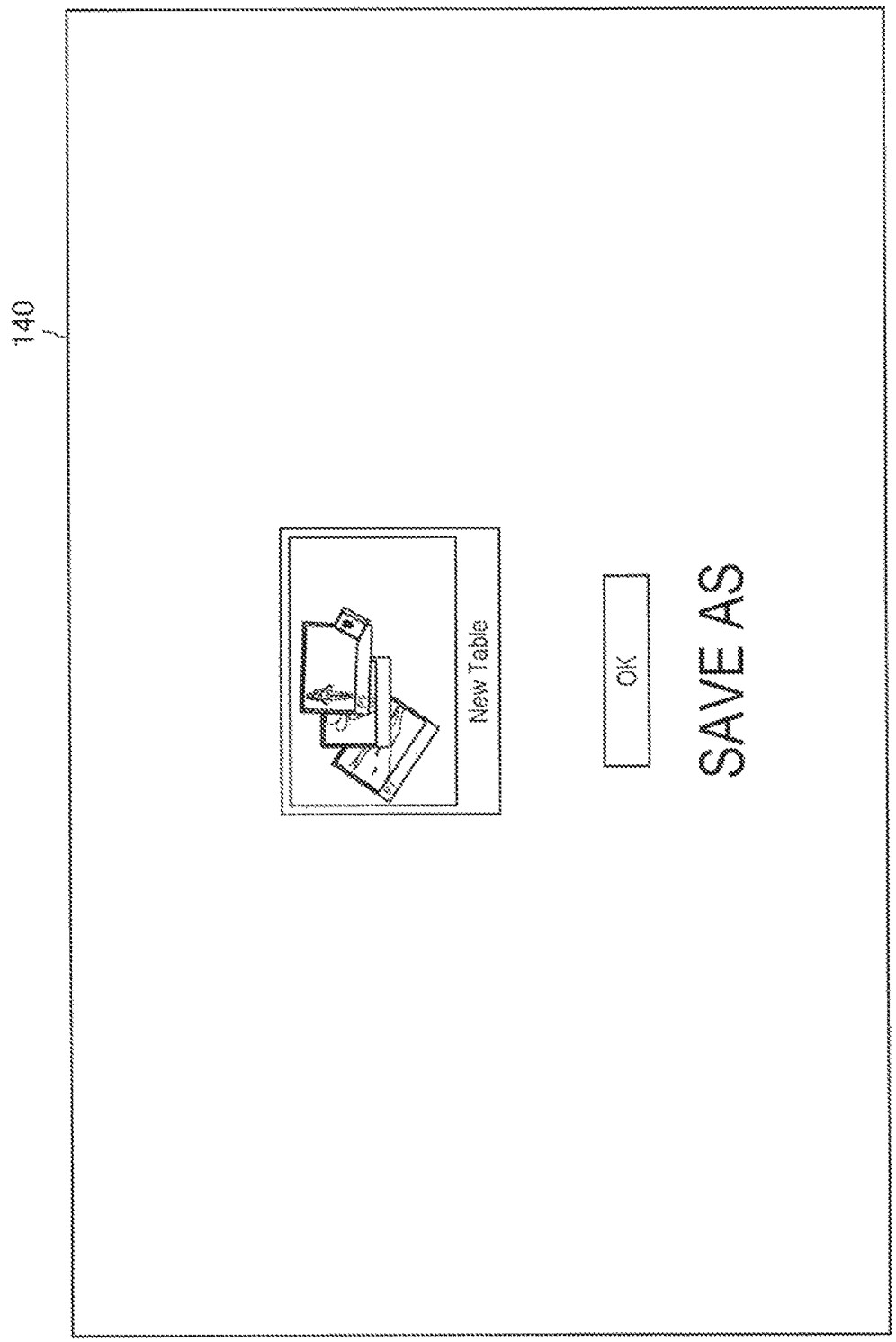
FIG. 17 is an explanatory diagram illustrating an example of a user interface.

FIG. 17 is an example of a user interface of a content browsing application to be displayed when asking the user whether to save the state of the table at a point in time at which the user selected the button U5*d* as the library.

In FIG. 17, a state in which an image obtained by reducing the state of the table at a point in time at which the user selected the button U5d and an "OK" button for allowing the user to save the table state as the library are displayed is illustrated. When the user selects the "OK" button in the screen illustrated in FIG. 17, the content browsing application saves the state of the table at a point in time at which the user selected the button U5d illustrated in FIG. 16 as the library. The content browsing application may save the library, for example, in the storage unit 150 or save the library in another device connected via the communication unit 160 using communication.

The state of the table to be saved as the library by the content browsing application is a display position for each piece of content, a display size, a rotated state, and a stacked state of the content. The stacked state of the content can be indicated by performing numbering in ascending order from a lowest layer.

In addition, when the content is a moving image or music, the content browsing application may save a reproduction position of the content as the library. In addition, the content browsing application may save a state of a background of the table or a state of a view of the content as the library.

The content browsing application provides a function of reproducing the state of the table saved as the library. Next, an example of a user interface when the state of the table saved as the library by the user is reproduced is shown.

Figure 18:
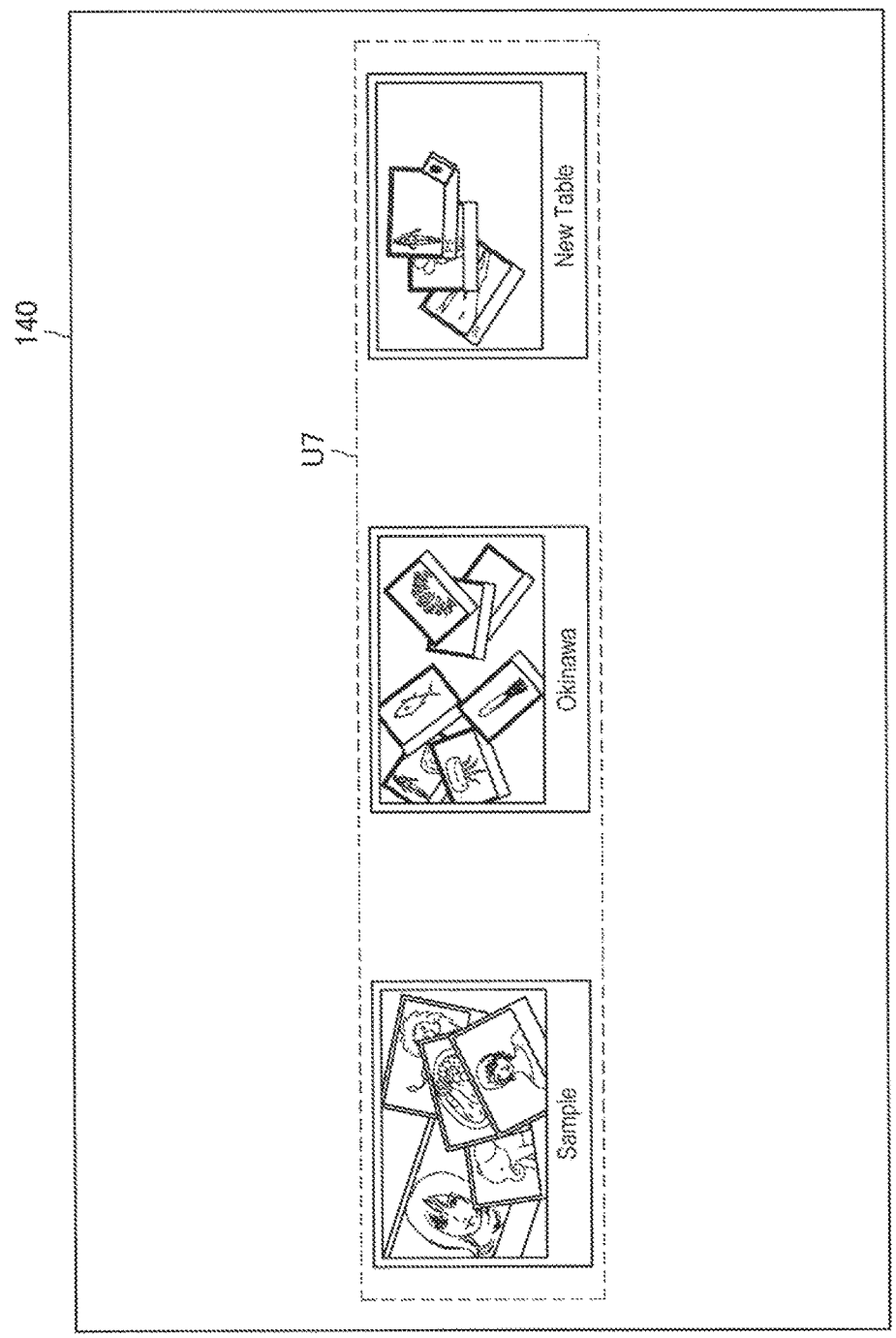
FIG. 18 is an explanatory diagram illustrating an example of a user interface.

FIG. 18 is an example of a user interface of the content browsing application to be displayed when the user selects one library from among saved libraries. The screen illustrated in FIG. 18, for example, is displayed when the button U5e for calling a saved library within the menu U5 as illustrated in FIG. 7 is selected by the user.

A thumbnail image of the library displayed in a library list display region U7 is a thumbnail image generated by the content browsing application from the library saved in the above-described library saving process. When the user selects one of thumbnail images of libraries displayed in the library list display region U7, the content browsing application reproduces content on the table based on data of the library selected by the user.

Figure 19:
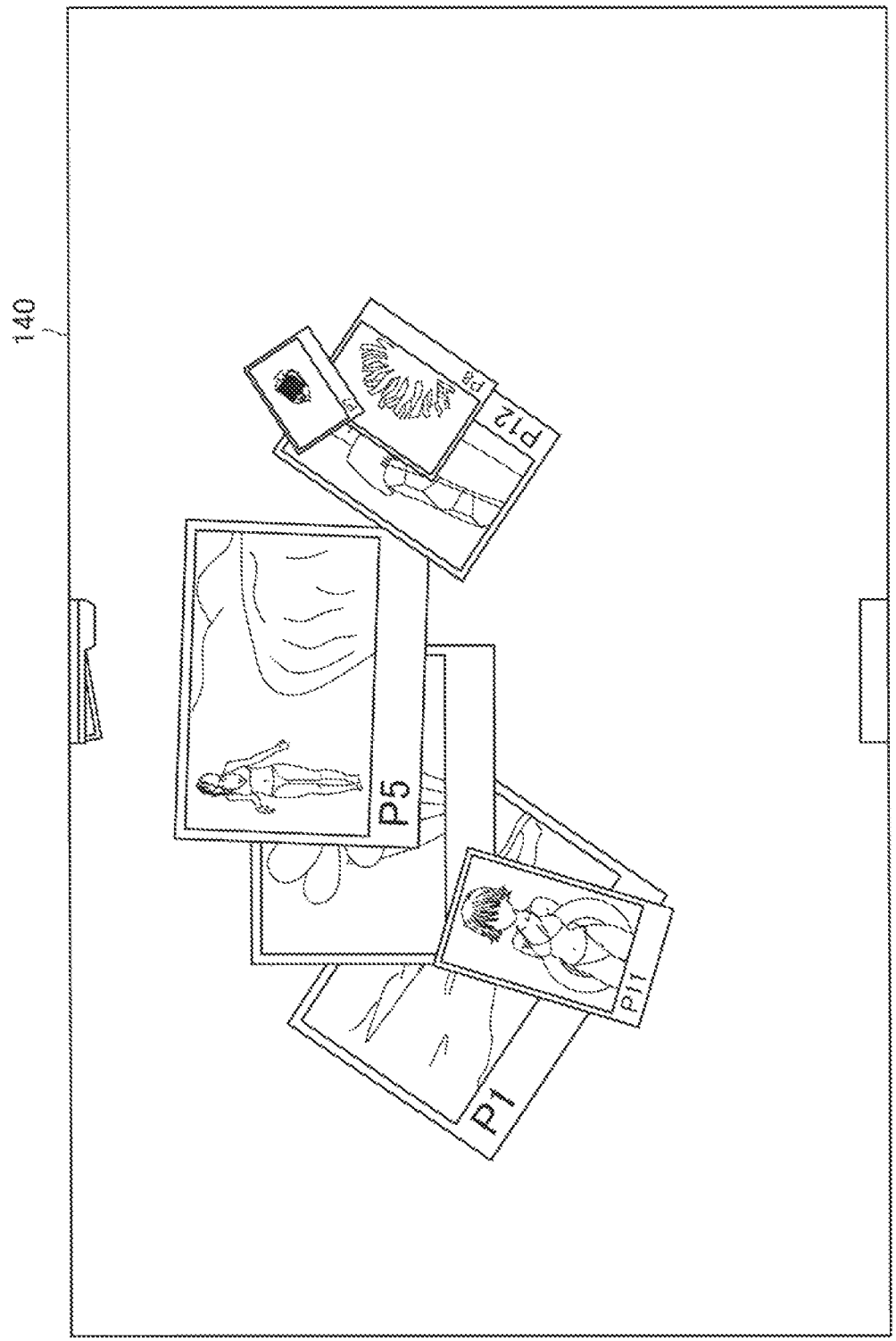
FIG. 19 is an explanatory diagram illustrating an example of a user interface.

FIG. 19 is an example of a user interface of the content browsing application to be displayed when the user selects one library from saved libraries. When the user selects one library from the saved libraries, the content browsing application reproduces content on the table based on data of the library selected by the user as illustrated in FIG. 19.

The content browsing application may reproduce content on the table based on data of the library selected by the user and display a message for prompting the user to determine whether to save a state of a current table when the user selects the button U5e for calling the saved library after changing a position or the like of content by performing a drag manipulation or the like on the content.

Figure 20:
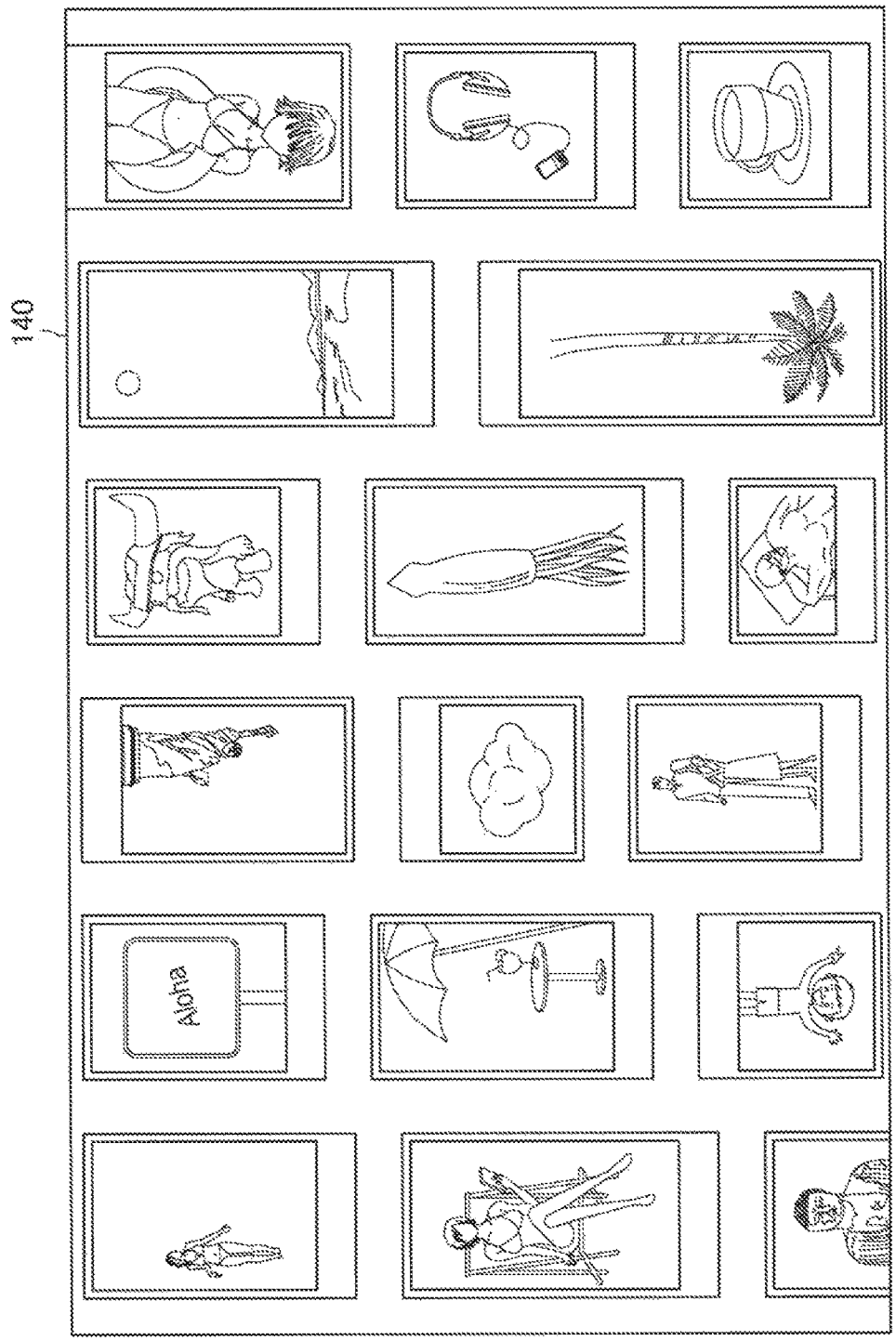
FIG. 20 is an explanatory diagram illustrating an example of a user interface.
Figure 21:
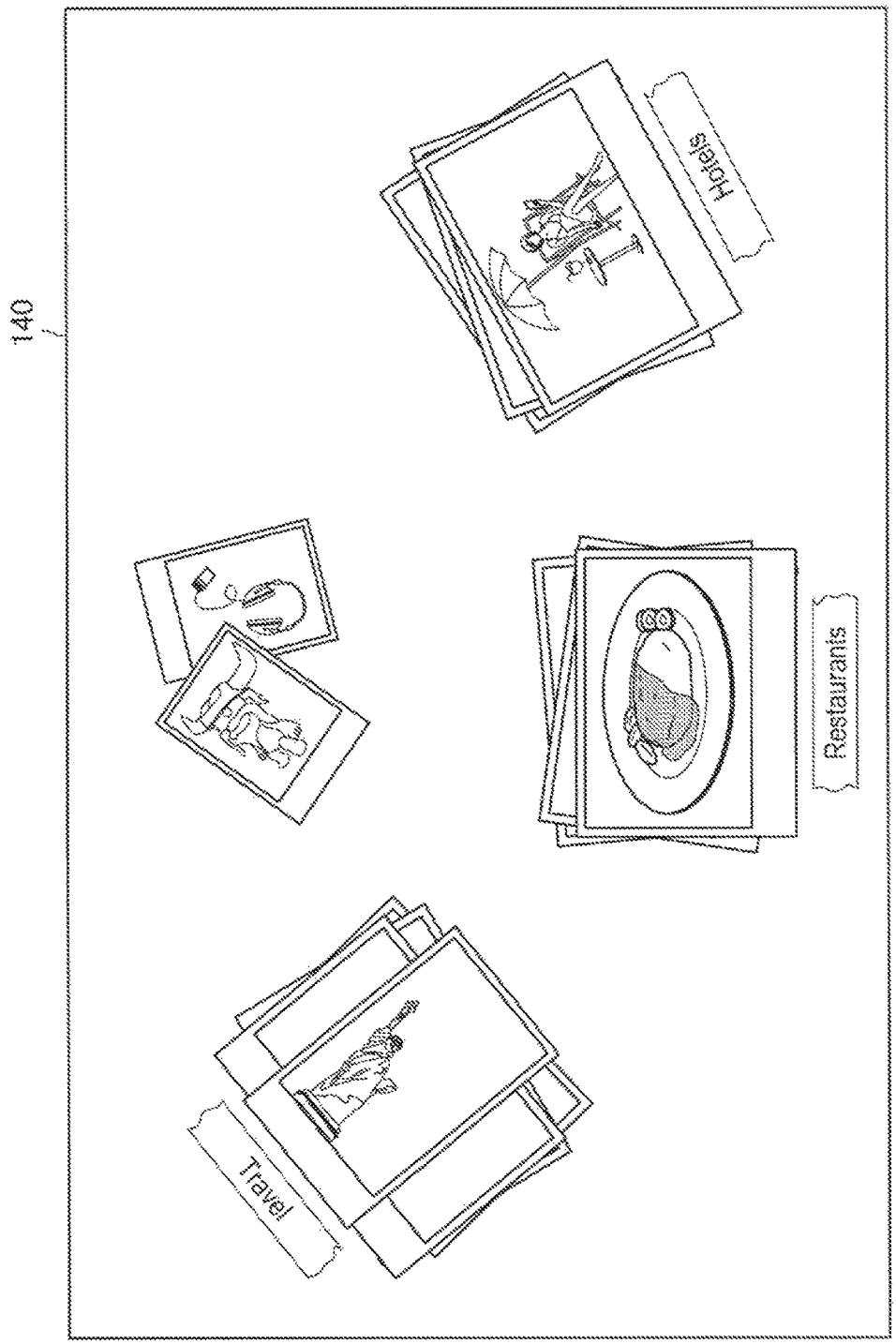
FIG. 21 is an explanatory diagram illustrating an example of a user interface.
Figure 22:
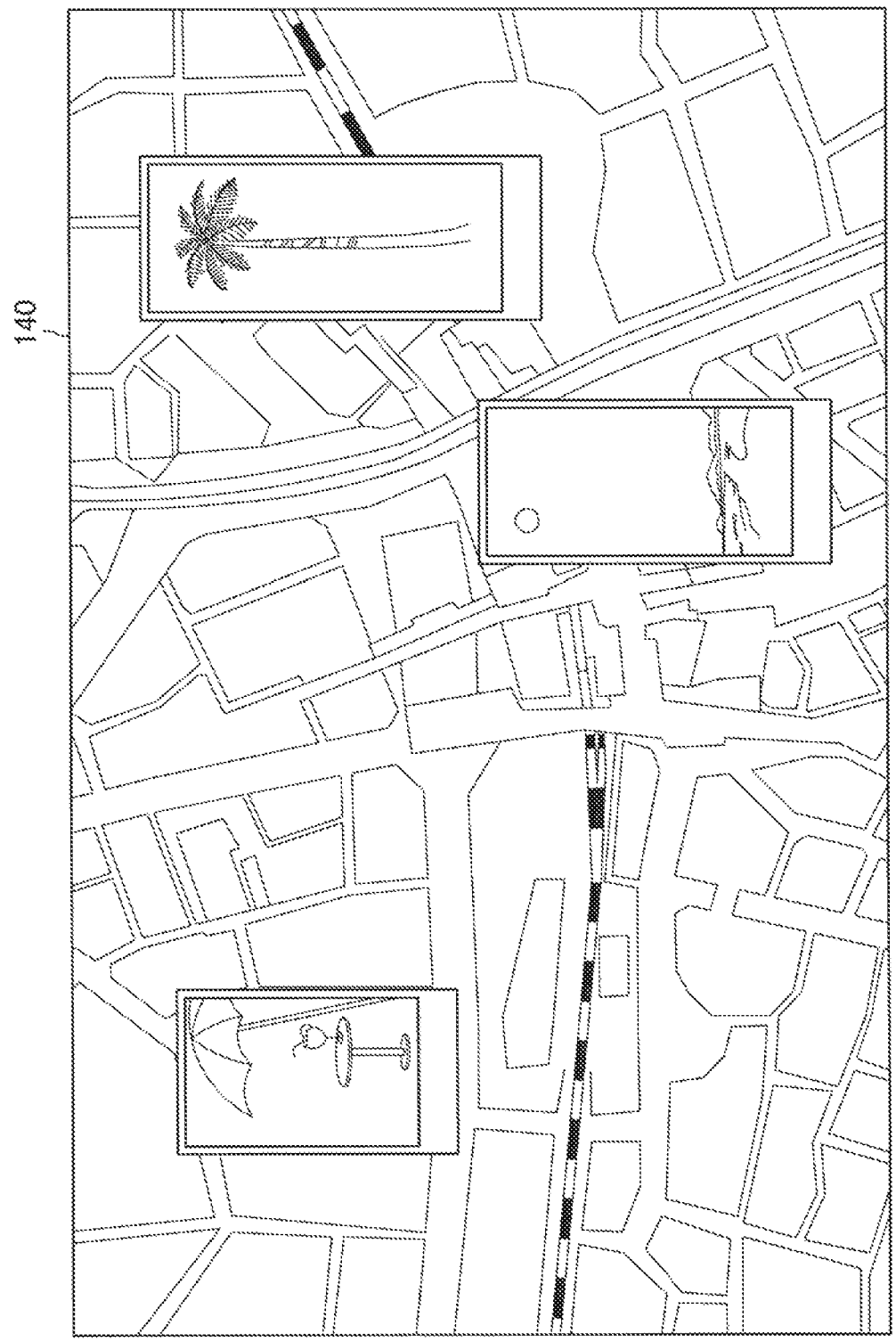
FIG. 22 is an explanatory diagram illustrating an example of a user interface.

Next, a view (content display form) provided by the content browsing application will be described. FIGS. 20 to 22 are explanatory diagrams illustrating examples of the user interface displayed on the display unit 140 according to the execution of the content browsing application.

FIG. 20 is an explanatory diagram illustrating an example of a view displayed to arrange content on a plane. The content browsing application displays content by performing switching to the view illustrated in FIG. 20 when the user selects the button U51c illustrated in FIG. 8.

FIG. 21 is an explanatory diagram illustrating an example of a view (stack view) in which content is classified and content having the same type or attribute is displayed in a stack. The content browsing application displays content by performing switching to the stack view illustrated in FIG. 21 when the user selects the button U51a illustrated in FIG. 8.

The content browsing application, for example, may integrate content having predetermined metadata into one pile when the content is displayed in a stack view form. For example, the content browsing application may integrate the content into one pile based on a condition such as content including the same keyword or content of imaging in a predetermined range around a certain place.

FIG. 22 is an explanatory diagram illustrating an example of a view (map view) in which content is displayed on a map. The content browsing application displays content by performing switching to the view illustrated in FIG. 21 when the user selects the button U51d illustrated in FIG. 8.

The content browsing application displays content in one view designated by the user from a plurality of views as described above. The content browsing application can allow the user to browse content in various forms by providing a plurality of views as described above.

An example in which the manipulation detection unit 120 detects manipulation content of the user for the manipulation unit 110 (that is, a touch panel provided to be integrated with the display unit 140) and the control unit 130 causes the display unit 140 to display various types of menus, icons, content, etc. according to the user's manipulation content detected by the manipulation detection unit 120 has been described above, but the present disclosure is not limited to this example. For example, even when the manipulation unit 110 is a mouse and a mouse cursor is displayed on the display unit 140 according to a manipulation of the manipulation unit 110 by the user, the control unit 130 can cause the display unit 140 to display various types of menus, icons, content, etc. according to manipulation content of the user detected by the manipulation detection unit 120.

When the manipulation unit 110 is the mouse and the mouse cursor is displayed on the display unit 140 according to a manipulation of the manipulation unit 110 by the user, the contact of the user's finger, the stylus pen, or the like can correspond to a click of the mouse and the proximity of the user's finger, the stylus pen, or the like can simply correspond to a state in which the mouse cursor is moved.

2. HARDWARE CONFIGURATION EXAMPLE

An operation of the above-described information processing device 100, for example, can be executed using a hardware configuration of the information processing device illustrated in FIG. 23. That is, the operation of the information processing device 100 may be implemented by controlling the hardware illustrated in FIG. 23 using a computer program. Also, a type of this hardware is arbitrary, and, for example, includes a personal computer, a mobile phone, a portable information terminal such as a PHS or a PDA, a game machine, a contact or non-contact type IC chip, a contact or non-contact type IC card, or various information home appliances. Here, PHS is an abbreviation for Personal Handy-phone System. Also, PDA is an abbreviation for Personal Digital Assistant.

As illustrated in FIG. 23, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Here, CPU is an abbreviation for Central Processing Unit. Also, ROM is an abbreviation for Read Only Memory. RAM is an abbreviation for Random Access Memory.

The CPU 902, for example, functions as an arithmetic processing unit or a control unit and controls all or a part of the operation of each structural element based on various programs recorded on the ROM 904, the RAM 906, the storage unit 920, or a removable recording medium 928. The ROM 904 is means for storing, for example, a program to be read to the CPU 902 or data or the like to be used in an arithmetic operation. The RAM 906 temporarily or permanently stores, for example, a program to be read to the CPU 902 or various parameters or the like which appropriately change at the time of execution of the program.

These structural elements are connected to each other by, for example, the host bus 908 capable of performing high-speed data transmission. The host bus 908, for example, is connected through the bridge 910 to the external bus 912 whose data transmission speed is relatively low. In addition, the input unit 916, for example, is a mouse, a keyboard, a touch panel, a button, a switch, or a lever. Furthermore, a remote controller capable of transmitting a control signal using infrared rays or other radio waves may be used as the input unit 916.

The output unit 918, for example, is a display device such as a CRT, an LCD, a PDP or an ELD, an audio output device such as a speaker or headphones, a printer, a mobile phone, or a facsimile, that can visually or auditorily notify a user of acquired information. Here, CRT is an abbreviation for Cathode Ray Tube. LCD is an abbreviation for Liquid Crystal Display. PDP is an abbreviation for Plasma Display Panel. Furthermore, ELD is an abbreviation for Electro-Luminescence Display.

The storage unit 920 is a device for storing various types of data. The storage unit 920, for example, is a magnetic storage device such as a hard disk drive (HDD), a semiconductor storage device, an optical storage device, or a magneto-optical storage device. Here, HDD is an abbreviation for Hard Disk Drive.

The drive 922, for example, is a device that reads information recorded on the removable recording medium 928 such as a magnetic disk, an optical disc, a magneto-optical disc, or a semiconductor memory, or writes information to the removable recording medium 928. The removable recording medium 928, for example, is a DVD medium, a Blu-ray medium, an HD-DVD medium, various types of semiconductor storage media, or the like. Of course, the removable recording medium 928, for example, may be an electronic device or an IC card on which a non-contact type IC chip is mounted. Here, IC is an abbreviation for Integrated Circuit.

The connection port 924 is a port such as a USB port, an IEEE1394 port, an SCSI, an RS-232C port, or a port for connecting an externally connected device 930 such as an optical audio terminal. The externally connected device 930, for example, is a printer, a mobile music player, a digital camera, a digital video camera, or an IC recorder. Here, USB is an abbreviation for Universal Serial Bus. Also, SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is constituted of a network connected by wire or wirelessly, and, for example, is the Internet, a home-use LAN, infrared communication, visible light communication, broadcasting, or satellite communication, for example. Here, LAN is an abbreviation for Local Area Network. In addition, WUSB is an abbreviation for Wireless USB. ADSL is an abbreviation for Asymmetric Digital Subscriber Line.

For example, when the information processing device 100 has the above-described hardware configuration, for example, the CPU 902 can perform the function of the manipulation detection unit 120 or the control unit 130. In addition, for example, the input unit 916 can perform the function of the manipulation unit 110. In addition, for example, the input unit 916 can perform the function of the manipulation unit 110 and the ROM 904, the RAM 906, the storage unit 920, or the removable recording medium 928, for example, can perform the function of the storage unit 150. In addition, for example, the output unit 918 can perform the function of the display unit 140. In addition, for example, the communication unit 926 can perform the function of the communication unit 160.

3. CONCLUSION

According to an embodiment of the present disclosure as described above, the information processing device 100 for executing a content browsing application capable of enabling a plurality of users to efficiently use content on the same screen is provided. The information processing device 100 for executing the content browsing application displays a menu for displaying a thumbnail image of content referred to as a drawer menu on each side by allowing the user to perform the swipe manipulation in a direction from the vicinity of the center of each side of the display unit 140 to a screen center.

In addition, according to the embodiment of the present disclosure, the information processing device 100 for executing the content browsing application capable of implementing a manipulation of arranging two pieces of content in a manipulation of causing content to collide is provided. The information processing device 100 according to an embodiment of the present disclosure can allow the user to easily perform a manipulation of arranging two pieces of content by executing the content browsing application.

For example, it is not necessarily necessary to perform the steps in the processing of each device in this specification in chronological order according to the sequence shown in the flowcharts. For example, the steps in the processing of each device may be processed in a sequence different from the sequence shown in the flowchart or processed in parallel.

In addition, it is also possible to create a computer program that causes hardware such as a CPU, a ROM and a RAM incorporated into each device to perform the equivalent functions to the elements of each device described above. In addition, a recording medium in which such a computer program is stored can also be provided. In addition, each functional block illustrated in the functional block diagrams can be configured by the hardware, so that a series of processes may be implemented in hardware.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

A manipulation for displaying the drawer menu in the content browsing application has been described as the swipe manipulation in the above-described example, but the present disclosure is not limited to this example. For example, in the content browsing application, the manipulation for displaying the drawer menu may be the double-tap manipulation on a peripheral edge of a screen.

Additionally, the present technology may also be configured as below.

(1)

An information processing device including:
a manipulation detection unit configured to detect a manipulation by a user; and
a control unit configured to control display on a screen according to the detection of the manipulation detection unit,
wherein the control unit performs control to cause, when the manipulation detection unit detects a manipulation for bringing at least two pieces of content displayed on the screen into contact with each other under control by the control unit, the at least two pieces of content to be displayed in alignment.

(2)

The information processing device according to (1), wherein the control unit performs control to cause the at least two pieces of content to be displayed in alignment when the manipulation detection unit detects that the at least two pieces of content come in contact at any one point.

(3)

The information processing device according to (1), wherein the control unit performs control to cause the at least two pieces of content to be displayed in alignment when the manipulation detection unit detects that the at least two pieces of content come in contact at a relative speed greater than or equal to a predetermined speed.

(4)

The information processing device according to (1), wherein the control unit performs control to cause the at least two pieces of content to be displayed in alignment when the manipulation detection unit detects that the at least two pieces of content come in contact at a relative angle greater than or equal to a predetermined angle at the time of the contact.

(5)

The information processing device according to any of (1) to (4), wherein the control unit performs control to cause animation display from a state at the time of the contact to a state of alignment to be performed when the at least two pieces of content are aligned.

(6)

An information processing method including:
detecting a manipulation by a user; and
controlling display on a screen according to the detection of the manipulation by the user,
wherein, when a manipulation for bringing at least two pieces of content displayed on the screen into contact with each other is detected, the at least two pieces of content are controlled to be displayed in alignment.

(7)

A computer program for causing a computer to execute:
detecting a manipulation by a user; and
controlling display on a screen according to the detection of the manipulation by the user,
wherein, when a manipulation for bringing at least two pieces of content displayed on the screen into contact with each other is detected, the at least two pieces of content are controlled to be displayed in alignment.

REFERENCE SIGNS LIST

100 information processing device
110 manipulation unit
120 manipulation detection unit
130 control unit
140 display unit
150 storage unit
160 communication unit

The invention claimed is:

1. An information processing device comprising:
a manipulation detection unit configured to detect a manipulation by a user; and
a control unit configured to control display of a plurality of pieces of content on a surface of a screen according to the detection of the manipulation detection unit,
wherein the manipulation detection unit detects a drag manipulation on at least two pieces of content of the plurality of pieces of content that brings the at least two pieces of content into contact with each other under control by the control unit,
wherein the control unit performs control to initiate, in response to the detected drag manipulation that brings the at least two pieces of content into contact with each other;
display of the at least two pieces of content in alignment on a front surface;
display of a plurality of icons for manipulating each of the at least two pieces of content; and
semi-transparent display of other content of the plurality of pieces of content on the surface behind the at least two pieces of content displayed on the front surface, and
wherein the manipulation detection unit and the control unit are each implemented via at least one processor.

2. The information processing device according to claim 1, wherein the control unit performs control to cause the at least two pieces of content to be displayed in alignment when the manipulation detection unit detects that the at least two pieces of content come in contact at any one point.

3. The information processing device according to claim 1, wherein the control unit performs control to cause the at least two pieces of content to be displayed in alignment when the manipulation detection unit detects that the at least two pieces of content come in contact at a relative speed greater than or equal to a predetermined speed.

4. The information processing device according to claim 1, wherein the control unit performs control to cause the at least two pieces of content to be displayed in alignment when the manipulation detection unit detects that the at least two pieces of content come in contact at an angle of a movement direction of the at least two pieces of content greater than or equal to a predetermined angle at a time of the contact.

5. The information processing device according to claim 1, wherein the control unit performs control to cause animation display from a state at a time of the contact to a state of alignment to be performed when the at least two pieces of content are aligned.

6. The information processing device according to claim 1, wherein the control unit performs control to cause, when the manipulation detection unit detects the manipulation for bringing the at least two pieces of content displayed on the screen into contact with each other under control by the control unit, a state in which the at least two pieces of content can be manipulated and the other content cannot be manipulated.

7. The information processing device according to claim 1, wherein the control unit performs control to cause, when the manipulation detection unit detects the manipulation for bringing the at least two pieces of content displayed on the screen into contact with each other under control by the control unit an icon for causing the screen to transition from the two pieces of content being displayed in alignment on the front surface and the other content being displayed behind the at least two pieces of content to a state before the two pieces of content are brought into contact with each other.

8. The information processing device according to claim 7, wherein the state before the two pieces of content are brought into contact each other is a state immediately before the contact.

9. The information processing device according to claim 8, wherein the state before the two pieces of content are brought into contact each other is a state after the detection of the drag manipulation.

10. An information processing method comprising:
   detecting a manipulation by a user;
   displaying a plurality of pieces of content on a surface of a screen according to the detection of the manipulation by the user;
   detecting a drag manipulation on at least two pieces of content of the plurality of pieces of content that brings the at least two pieces of content into contact with each other; and
   initiating, in response to the detected drag manipulation that brings the at least two pieces of content into contact with each other;
   display of the at least two pieces of content in alignment on a front surface;
   display of a plurality of icons for manipulating each of the at least two pieces of content; and
   semi-transparent display of other content of the plurality of pieces of content on the surface behind the at least two pieces of content displayed on the front surface.

11. A non-transitory computer-readable medium having embodied thereon a program, which when executed by a computer causes the computer to execute an information processing method, the method comprising:
   detecting a manipulation by a user;
   displaying a plurality of pieces of content on a surface of a screen according to the detection of the manipulation by the user;
   detecting a drag manipulation on at least two pieces of content of the plurality of pieces of content that brings the at least two pieces of content into contact with each other; and
   initiating, in response to the detected drag manipulation that brings the at least two pieces of content into contact with each other;
   display of the at least two pieces of content in alignment on a front surface;
   display of a plurality of icons for manipulating each of the at least two pieces of content; and
   semi-transparent display of other content of the plurality of pieces of content on the surface behind the at least two pieces of content displayed on the front surface.

* * * * *